(12) United States Patent
Langworthy et al.

(10) Patent No.: US 12,502,944 B2
(45) Date of Patent: Dec. 23, 2025

(54) FRAME ASSEMBLY AND INTEGRAL BATTERY STRUCTURE

(71) Applicants: Kevin R. Langworthy, Grand Blanc, MI (US); Joseph Yaldo, Troy, MI (US); Ryan Warpup, Orion, MI (US); Sunny Kharbanda, Rochester Hills, MI (US); Shrikanth Gujjal, Rochester Hills, MI (US)

(72) Inventors: Kevin R. Langworthy, Grand Blanc, MI (US); Joseph Yaldo, Troy, MI (US); Ryan Warpup, Orion, MI (US); Sunny Kharbanda, Rochester Hills, MI (US); Shrikanth Gujjal, Rochester Hills, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 18/931,830

(22) Filed: Oct. 30, 2024

(65) Prior Publication Data
US 2025/0050725 A1 Feb. 13, 2025

Related U.S. Application Data

(63) Continuation of application No. 17/793,727, filed as application No. PCT/US2021/014282 on Jan. 21, 2021, now Pat. No. 12,151,547.
(Continued)

(51) Int. Cl.
*B60K 1/04* (2019.01)
*B62D 21/09* (2006.01)
(Continued)

(52) U.S. Cl.
CPC ............... *B60K 1/04* (2013.01); *B62D 21/09* (2013.01); *H01M 50/204* (2021.01);
(Continued)

(58) Field of Classification Search
CPC ............. B60K 1/04; B60K 2001/0438; B60K 2001/0472; B62D 21/09; B62D 21/02;
(Continued)

(56) References Cited

U.S. PATENT DOCUMENTS 9,108,497 B2 * 8/2015 Harrison, III ............ B60K 1/04
11,465,482 B2 * 10/2022 Menon ................ H01M 50/204
(Continued)

FOREIGN PATENT DOCUMENTS

CN  202174925 U * 3/2012 ............... B60K 1/04
CN  219544890 U * 8/2023
(Continued)

*Primary Examiner* — Drew J Brown
(74) *Attorney, Agent, or Firm* — DICKINSON WRIGHT PLLC

(57) ABSTRACT

A frame assembly for an automobile includes a pair of front frame rails disposed in spaced relationship with a pair of rear frame rails. An upper cover is connected to and extends between the pair of front frame rails and the pair of rear frame rails to define a roof portion. The upper cover includes a pair of longitudinal sidewalls and a pair of cross sidewalls each extending downwardly from the roof portion to define an upper pocket bounded by each of the roof portion, the pair of longitudinal sidewalls and the pair of cross sidewalls. A base plate includes a plate portion for supporting at least one battery module. The base plate is disposed in abutting and connected relationship with the upper cover to dispose the at least one battery module within the upper pocket.

13 Claims, 31 Drawing Sheets

Related U.S. Application Data

(60) Provisional application No. 63/008,039, filed on Apr. 10, 2020, provisional application No. 62/963,718, filed on Jan. 21, 2020.

(51) Int. Cl.
*H01M 50/204* (2021.01)
*H01M 50/249* (2021.01)
*H01M 50/262* (2021.01)
*H01M 50/271* (2021.01)

(52) U.S. Cl.
CPC ....... *H01M 50/249* (2021.01); *H01M 50/262* (2021.01); *H01M 50/271* (2021.01); *B60K 2001/0438* (2013.01); *H01M 2220/20* (2013.01)

(58) Field of Classification Search
CPC ............. H01M 50/204; H01M 50/249; H01M 50/262; H01M 50/271; H01M 2220/20; H01M 50/207; H01M 50/242; Y02E 60/10; Y02T 10/70; Y02T 10/7072; B60L 50/66; B60L 50/64
See application file for complete search history.

(56) References Cited

U.S. PATENT DOCUMENTS

| 12,202,359 | B2 * | 1/2025 | Hebert | B60L 53/80 |
| 2018/0126857 | A1 * | 5/2018 | Kelly-Morgan | C08L 33/14 |
| 2024/0014495 | A1 * | 1/2024 | Lanzerath | H01M 50/262 |
| 2024/0014496 | A1 * | 1/2024 | Wu | B60K 1/04 |
| 2024/0014528 | A1 * | 1/2024 | Kim | H01M 50/507 |
| 2024/0017626 | A1 * | 1/2024 | Cox | H01R 4/64 |

FOREIGN PATENT DOCUMENTS

| CN | 219651269 | U | * | 9/2023 | |
| CN | 112009228 | B | * | 12/2023 | ............... B60K 1/04 |
| EP | 2080656 | A1 | * | 7/2009 | ............... B60K 1/04 |
| FR | 2972169 | A1 | * | 9/2012 | ............... B60G 3/20 |
| JP | H07186733 | A | * | 7/1995 | |

* cited by examiner

FRAME ASSEMBLY AND INTEGRAL BATTERY STRUCTURE

CROSS-REFERENCE TO RELATED APPLICATIONS

This U.S. Continuation Patent Application claims the benefit of U.S. National Stage patent application Ser. No. 17/793,727 filed on Jul. 19, 2022, and titled "Frame Assembly And Integral Battery Structure" which claims the benefit of PCT International Patent Application Serial No. PCT/US2021/014282, filed Jan. 21, 2021, titled "FRAME ASSEMBLY AND INTEGRAL BATTERY STRUCTURE," which claims the benefit of U.S. Provisional Patent Application Ser. No. 62/963,718 filed on Jan. 21, 2020, and titled "Frame And Integral Battery Structure For A Pickup And SUV" and U.S. Provisional Patent Application Ser. No. 63/008,039 filed on Apr. 10, 2020, and titled "Integral Vehicle Frame And Battery Structure For Pickup And SUV", the entire disclosures of which are hereby incorporated by reference.

BACKGROUND OF THE INVENTION

1. Field of the Invention

The present invention relates a battery housing and a method of assembling same. More particularly, the present invention relates to a frame assembly that includes a battery housing at least partially integrated with a frame of an automobile and method of assembling same.

2. Related Art

This section provides background information related to the present disclosure which is not necessarily prior art.

Automobiles are the subject of a continuing effort to reduce weight and increase fuel efficiency without detracting from performance. This desire to increase fuel efficiency is both economically and environmentally motivated and has advanced internal components in automobiles as evidenced by developments in batteries, particularly in electrified automobiles. Electrified automobiles include a range of technologies that rely on electric energy to propel an automobile. Some electrified automobiles still rely predominantly on fossil fuels and use electricity as a supportive energy to improve fuel efficiency. Other electrified automobiles rely predominantly or entirely on electricity for propulsion of the automobile. Both electrified automobiles and traditional automobiles that operate entirely with fossil fuels utilize batteries to store electric energy and, while electric energy is a more economically and environmentally favorable technology than relying completely on fossil fuels, batteries are heavy, expensive, and relatively fragile compared to neighboring mechanical components. As such, the packaging of batteries, particularly within an electrified vehicle, requires a number of design considerations including weight distribution, temperature regulation, and serviceability. In terms of serviceability, there is a growing need particularly for electrified automobiles in which the batteries are located in an accessible configuration.

To meet the above minimum requirements, batteries have traditionally been packaged in protective housings that are constructed entirely independent from a frame of the automobile. These traditional housings have utilized metal intensive (aluminum and/or steel) designs to meet strength and fire resistance requirements at costs to increased weight, leak performance, and vulnerability to corrosion. In addition to the shortcomings during operation, these traditional housings also require a significant amount of energy, time, and capital to construct. For example, many traditional housings use aluminum extrusions welded to aluminum plates and meeting dimensional tolerances are difficult, oftentimes requiring further machining steps. Once constructed, traditional housings can be difficult to connect to a frame, provide additional weight, create weak points in the frame, and opportunities for galvanic corrosion without adding any supporting structure other than that required to carry the batteries.

Accordingly, there is a continuing desire to further develop and refine housing construction and operation such that they are not subjected to traditional drawbacks and provide additional structural support to the frame.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

According to one aspect of the disclosure, a battery housing assembly for an automobile is provided. The battery housing comprises an upper cover sized to abut and be connected to a top surface of a pair of longitudinal beams of a provided frame. A base plate includes a plate portion for carrying at least one provided battery module. The base plate is sized to abut and be connected to a bottom surface of the pair of longitudinal beams of the provided frame.

According to another aspect of the disclosure, a frame assembly for an automobile is provided. The frame assembly comprises a pair of front frame rails and a pair of rear frame rails. An upper cover spaces the pair of front frame rails from the pair of rear frame rails. A base plate is releasably connected to the upper cover to form a chamber for accommodating at least one battery module.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENT

Example embodiments will now be described more fully with reference to the accompanying drawings. In general, the subject embodiments are directed to a frame assembly that includes a battery housing at least partially integral with an automobile frame and method of assembling same. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
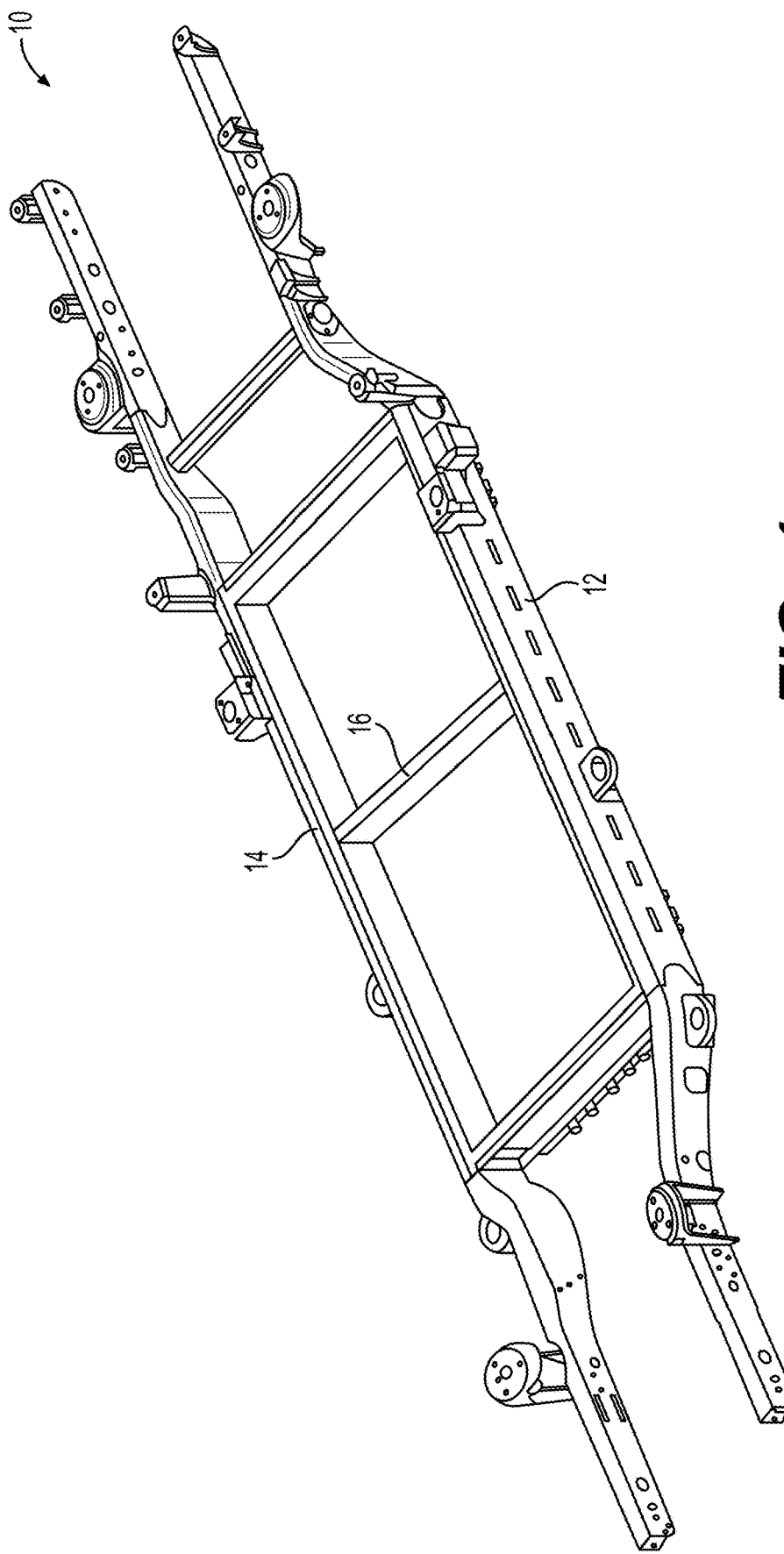
FIG. 1 is a perspective view of a traditional automobile frame.
Figure 2:
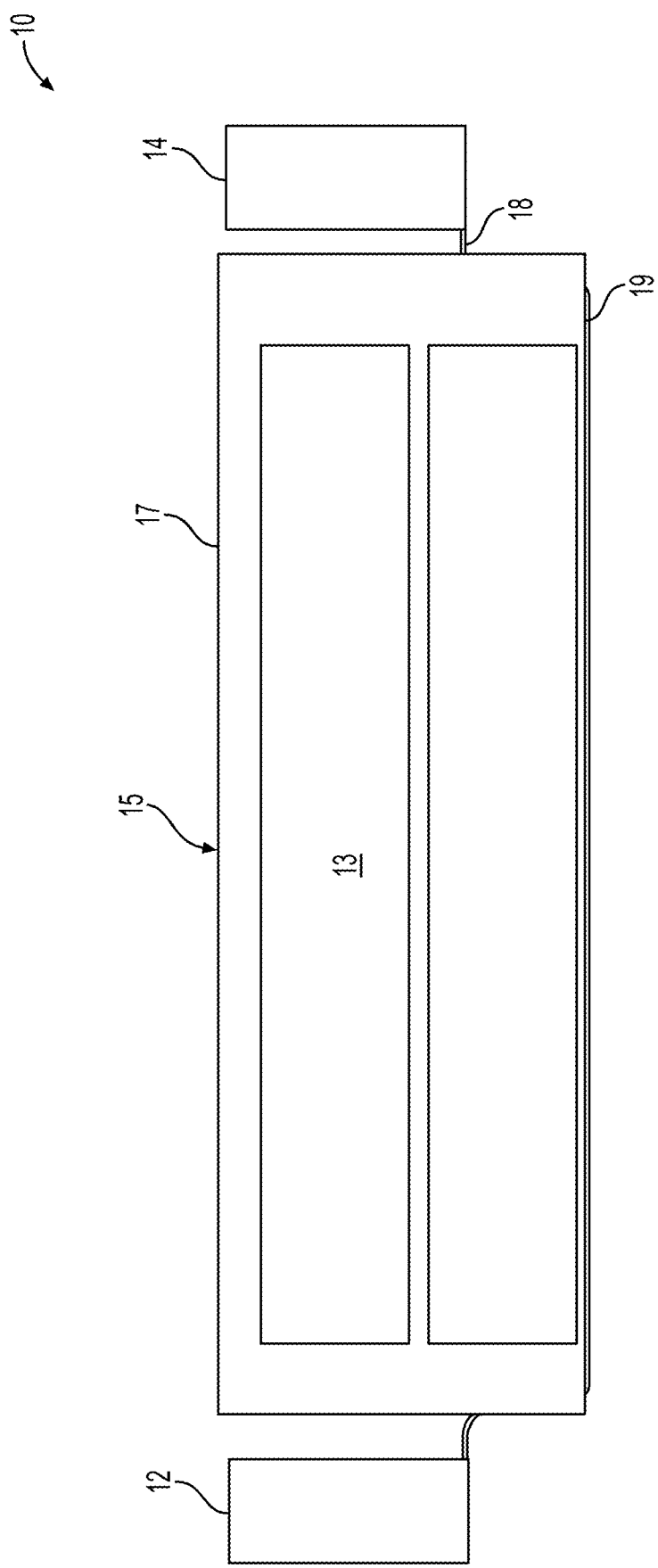
FIG. 2 is a cross-sectional view of the frame from FIG. 1 with a prior art non-integral battery housing connected thereto.

Referring initially to FIG. 1, a traditional automobile frame 10 is presented. These automobile frames 10 typically include a first longitudinal beam 12 and a second longitudinal beam 14. Both longitudinal beams 12, 14 are spaced by one or more cross-members 16. FIG. 2 illustrates a prior art, non-integral battery housing 15 that is releasably attached to the frame 10. More particularly, the non-integral battery housing 15 connects to the frame 10 via a bracket 18 that connects to the longitudinal beams 12, 14. The non-integral battery housing 15 includes a top portion 17 and a bottom portion 19 that define a chamber 13 for enclosing one or more battery modules. During service, this prior art configuration requires removable of the entire non-integral battery housing 15 via detachment of the bracket 18 from the longitudinal beams 12, 14 and removal of the top portion 17 from the bottom portion 19. Because the non-integral battery housing 15 must be strong enough to support all of the weight of the battery modules 13, it typically needs to be constructed out of relatively strong and heavy material that adds weight to the longitudinal beams 12, 14 without providing any supportive structures.

Referring to the remaining Figures, a frame assembly including a battery housing that is at least partially integral with an automobile frame is provided. The frame assembly is intended for providing a lightweight and relatively simple to construct design for protecting battery modules, effectively distributing weight, providing easy access for serviceability, eliminating redundancy of parts by providing a structural components that provide support to both the frame and the battery modules, and streamlining production and integration into existing and future automotive configurations. The frame assemblies as described herein may be used in an electrified or semi-electrified automobile, such as a car, pick-up truck, SUV, semi-truck or other automobiles.

Figure 3:
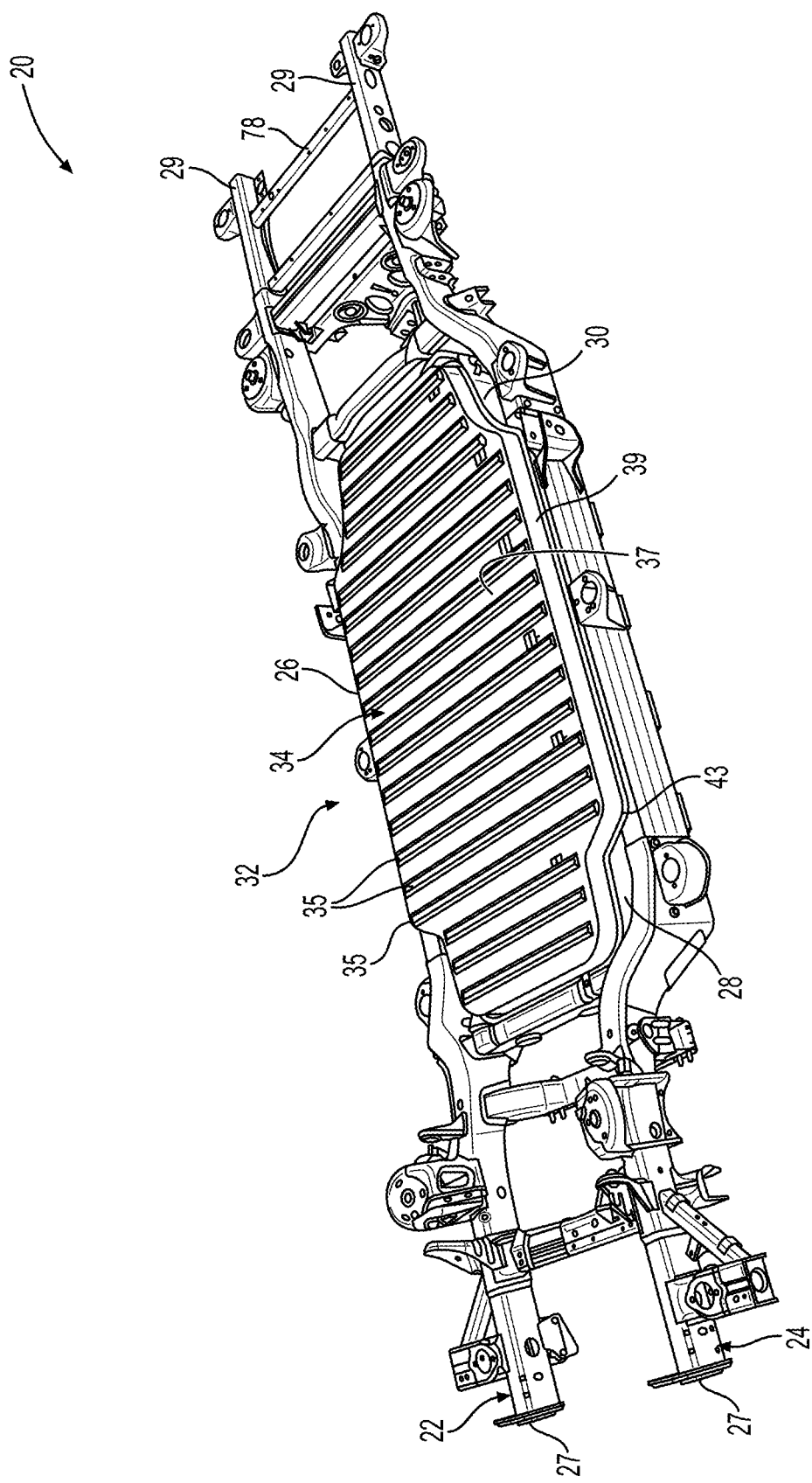
FIG. 3 is a top perspective view of a frame assembly for an automobile with an integrated battery housing in accordance with a first embodiment of the disclosure.
Figure 4:
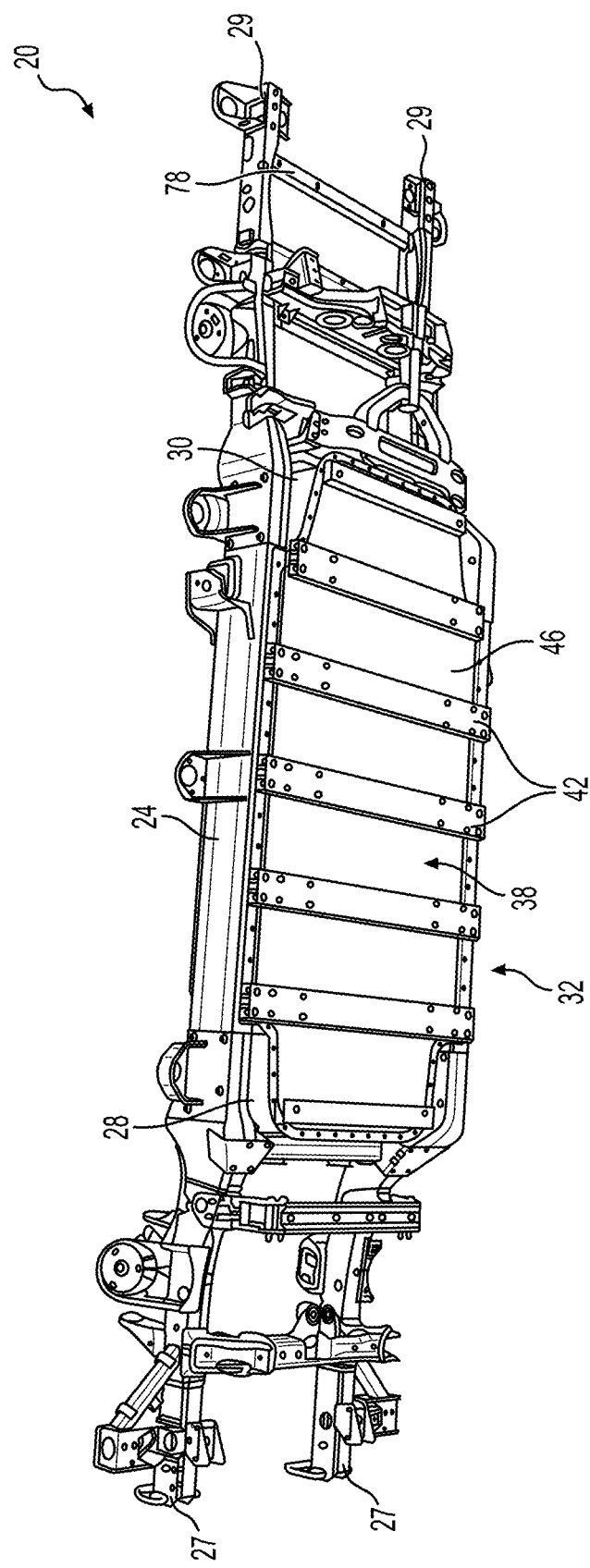
FIG. 4 is a bottom perspective view of the battery housing in a closed position in accordance with the first embodiment.
Figure 5:
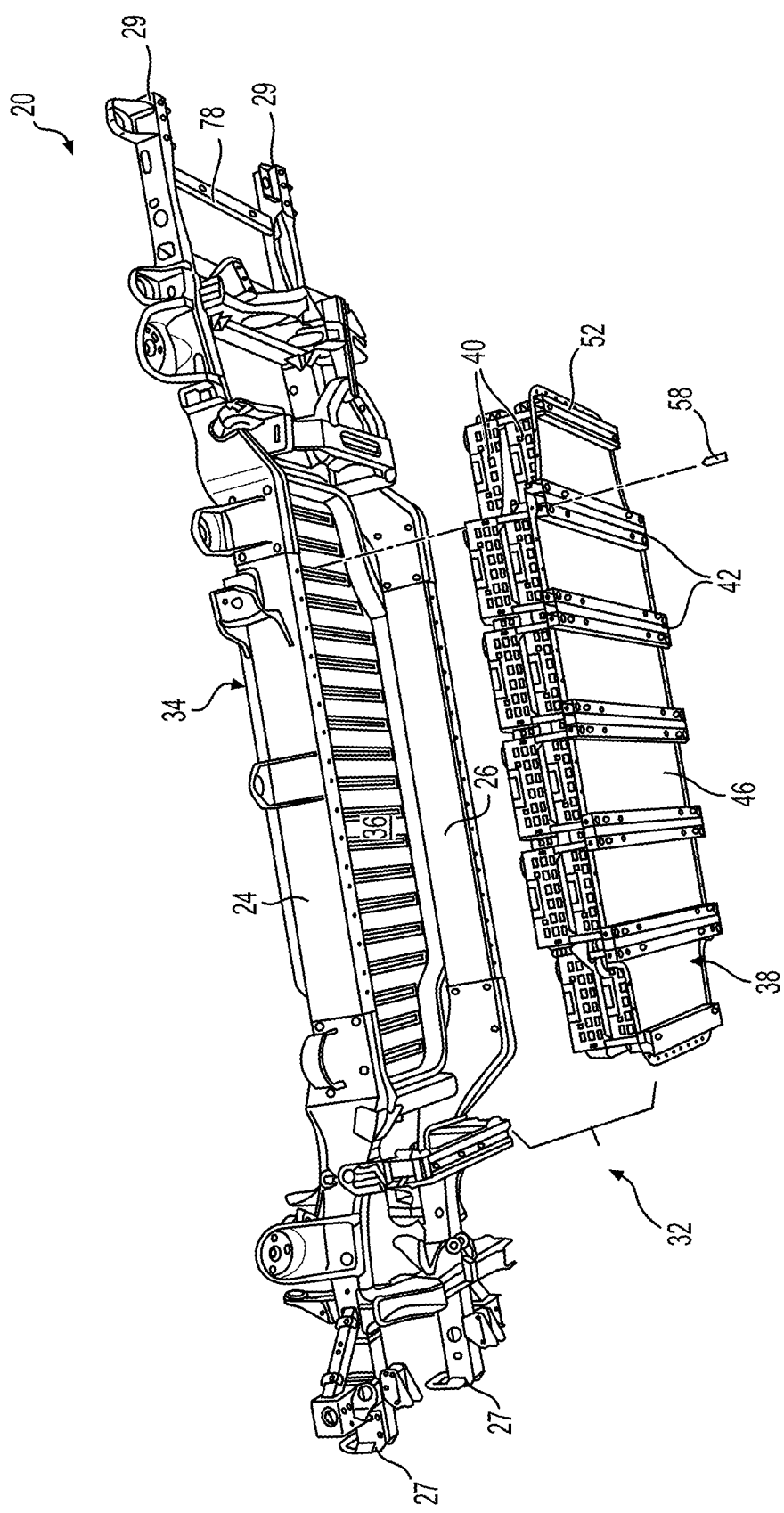
FIG. 5 is a bottom perspective view of the battery housing in the open position in accordance with the first embodiment.

FIG. 3 is a perspective top view of the frame assembly 20 with the battery housing at least partially integral with an automobile frame in accordance with a first embodiment. Unless otherwise indicated, the first embodiment may include the structures features and elements of the other embodiments described herein. The frame assembly 20 includes a frame 22 having a pair of longitudinal beams 24, 26 (or rails) that each extend between a front frame rail 27 and a rear frame rail 29. The frame 22 further includes at least one cross-member 28, wherein the pair of longitudinal beams 24, 26 are spaced apart by the at least one cross-member 28. The at least one cross-member 28 preferably includes a first cross-member 28 and a second cross-member 30. Spacing between the first and second cross-members 28, 30 and the longitudinal beams 24, 26 provides a location for the integrated battery housing 32 (i.e., battery housing assembly). More particularly, the battery housing 32 includes an upper cover 34 that extends between the first and second cross-members 28, 30 and the longitudinal beams 24, 26. The upper cover 34 includes a top surface 37 and sidewalls 39 extending along a peripheral edge of the top surface 37 to a flange 43. The upper cover 34 may be permanently connected (for example, welding on the flange 43) or integral to top portions of the first and second cross-members 28, 30 and the longitudinal beams 24, 26, such that an upper pocket 36 (FIG. 5) is formed between an underside of the upper cover 34, the longitudinal beams 24, 26, and the cross-members 28, 30. Connection between the upper cover 34 and the frame 22 may be accomplished by a weld seam 31 (FIG. 8) formed via welding methods such as, for example, metal inert gas (MIG), friction stir welding (FSW), cold metal transfer (CMT), laser welding, mechanical fasteners e.g., bolts, or a combination thereof. The upper cover 34 includes formed stiffeners 35 that extend perpendicularly to the longitudinal beams 24, 26, i.e., in the cross-car direction. The formed stiffeners 35 provide support in both the cross-car and fore-aft directions. The formed stiffeners 35 may be thicker than the rest of the upper cover 34 or may be molded from the same thickness. As shown in FIG. 4, the battery housing 32 further includes a base plate 38 that is releasably connected (i.e., non-integral) to the frame 22 and is formed to hold at least one but preferably a plurality of battery modules 40 (FIG. 5). The battery modules 40 may be rectilinear, prismatic, cylindrical, or other varieties. The base plate 38 connects to lower portions of the first and second cross-members 28, 30 and the longitudinal beams 24, 26, to form a chamber 41 (FIG. 8) such that the battery modules 40 are completely enclosed within the chamber 41 and protected from the outside environment. At least one support beam 42, which may include a plurality of support beams, extends below the base plate 38 and connects to both longitudinal beams 24, 26 for providing support to the underside of the base plate 38. In addition to supporting the battery modules 40, the support beams 42 provide support to the frame 22 in the fore-aft and cross-car directions. The chamber 41 is formed by the upper cover 34, the base plate 38, the longitudinal beams 24, 26, and the first and second cross-members 28, 30, which completely enclose the battery modules 40.

Figure 6:
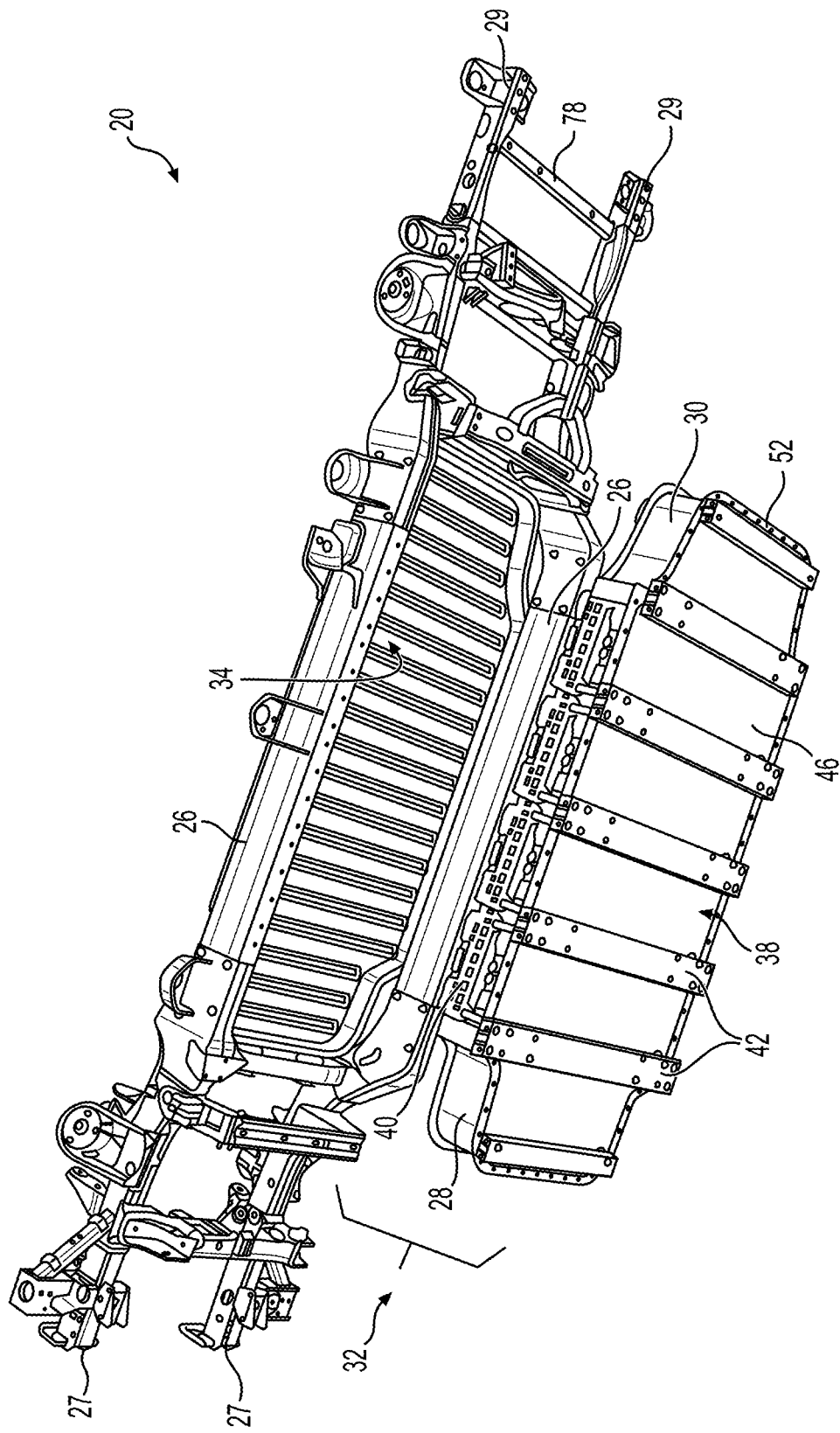
FIG. 6 is another bottom perspective view of the battery housing in the open position in accordance with the first embodiment.

As best illustrated in FIGS. 5 and 6, the frame assembly 20 is shown in an open position. The base plate 38 includes a plate 46 and a flange 52 extending around a peripheral edge of the plate 46 that sits flush against the lower portions of the first and second cross-members 28, 30 and the longitudinal beams 24, 26. The flange 52 may be connected to the frame 22 via fasteners, clamps, or the like. In some embodiments, the flange 52 may be releasably connected to the frame 22 with fasteners 58 that extend through the flange 52 and into the lower portions of the first and second cross-members 28, 30 and the longitudinal beams 24, 26. One or more seals 60 (FIG. 7) may extend along the entire flange 52 (interior of the fasteners 58) to provide sealing contact when the base plate 38 is fastened to the frame 22. As best illustrated in FIG. 4, the support beams 42 extend between opposite sides of the flange 52 such that at least some of the fasteners 58 extend through the support beams 42, the plate 46, and the longitudinal beams 24, 26. In some embodiments, a support beam 42 may be located adjacent to each of the cross-members 28, 30 for receiving fasteners 58 therethrough.

Figure 7:
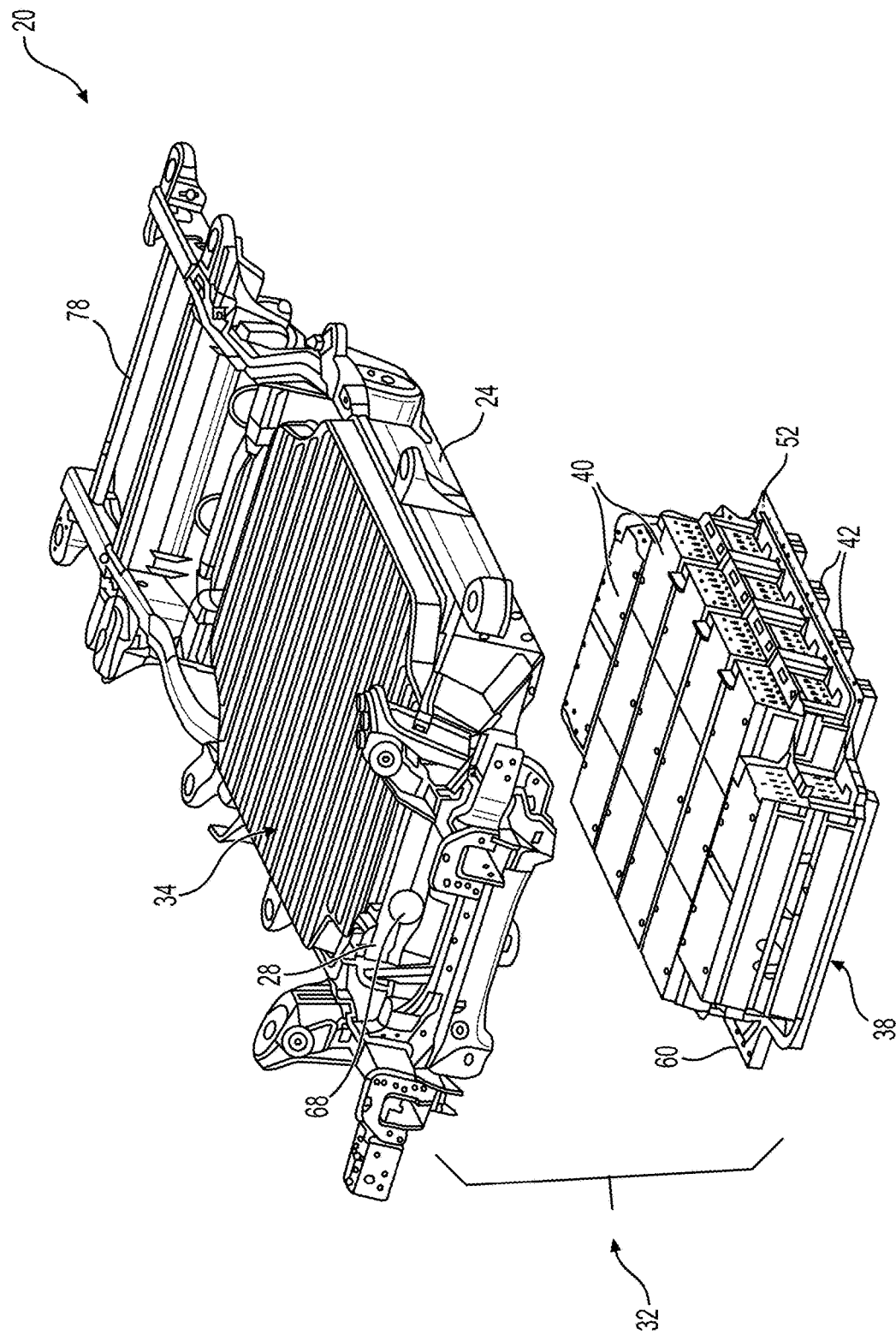
FIG. 7 is a front perspective view of the battery housing in the open position in accordance with the first embodiment.

As best illustrated in FIG. 7, one of the cross-members 28, 30 and/or longitudinal beams 22, 24 may include at least one opening 68 for connecting the battery modules to the automotive electrical system. The opening 68 may likewise be placed in any other structure of the battery housing 32 and frame 22, such that the battery modules 40 can be accessed without removal of the base plate 38.

In use, the battery modules 40 sit on top of the plate 46 of the base plate 38. The base plate 38 is then placed into contact with the frame 22 such that the battery modules 40 are located in the upper pocket 36. More particularly, the flange 52 is brought into connection with the lower portions of the first and second cross-members 28, 30 and the longitudinal beams 24, 26 and connected thereto with fasteners 58. The battery modules 40 are thus completely enclosed between the base plate 38, the upper cover 34, side portions of the longitudinal beams 24, 26, and side portions of the cross-members 28, 30. The upper cover 34, the longitudinal beams 24, 26, the cross-members 28, 30, the base plate 38, and the support beams 42 all provide strength to the frame 22 as additional functionality in addition to enclosing and supporting the battery modules 40.

Figure 8:
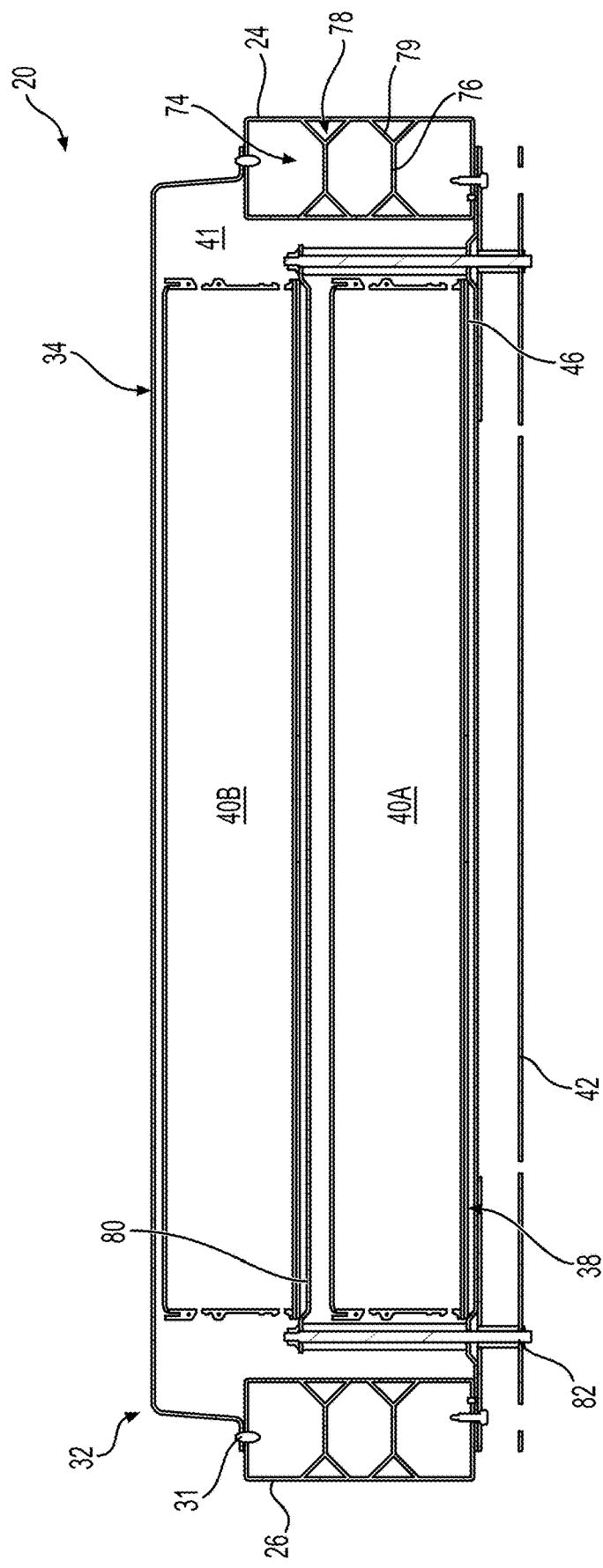
FIG. 8 a cross-sectional view of the frame assembly the battery housing integrated therewith in accordance with the first embodiment.

A cross-section of vertically stacked battery modules 40 in the frame assembly 20 is illustrated in FIG. 8. Each of the longitudinal beams 24, 26 may include a rectilinear outer casing that is hollow and includes at least one interior structural webbing 74 for added support and forming individual cells. In some embodiments, there are seven distinct cells. The at least one structural webbing 74 extends within the hollow longitudinal beams 24, 26 in the cross-car and fore-aft directions. In the cross-car direction, the at least one structural webbing 74 includes a central section 76 that extends between a pair of trusses 78. Each truss 78 includes two sections 79 extending at an angle from the central section 76. Preferably each section 79 extends at an opposite but equal angle from the other corresponding section 79 on the same side of the central section 76. In the fore-aft direction, the structural webbing 74 may extend the entire length of the longitudinal beams 24, 26. The at least one structural webbing 74 may include a plurality of structural webbings 74 of same or different shape.

With continued reference to FIG. 8, the battery modules 40 are vertically stacked and include a lower level 40A and an upper level 40B. The plate 46 supports the lower level 40A and a panel 80 supports the upper level 40B. The panel 80 is connected to the plate 46 via connection bolts 82. At least some of the bolts 82 extend through support beams 42, the plate 46, and the panel 80.

Figure 9:
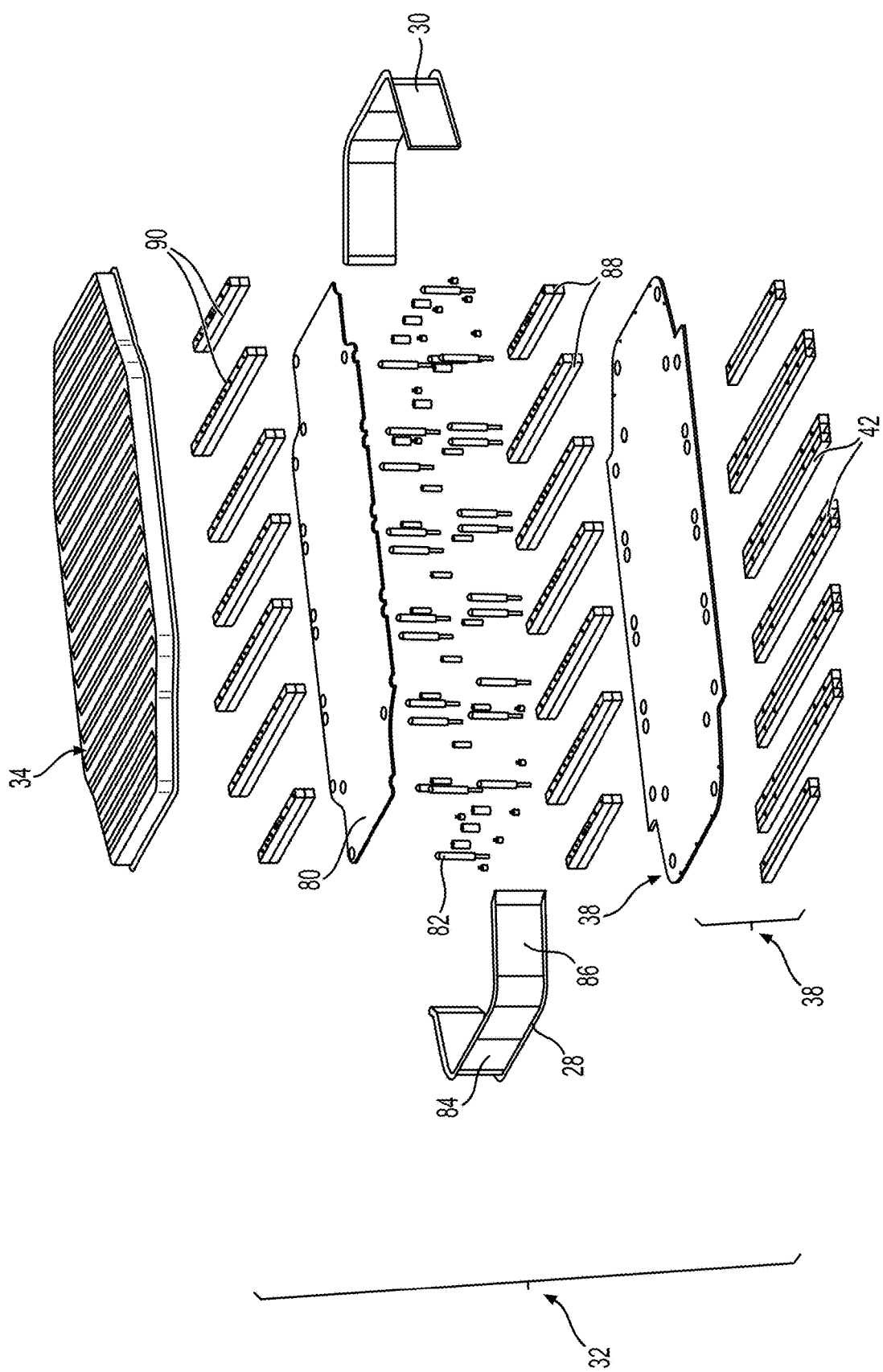
FIG. 9 is a disassembled view of the battery housing in accordance with the first embodiment.
Figure 10:
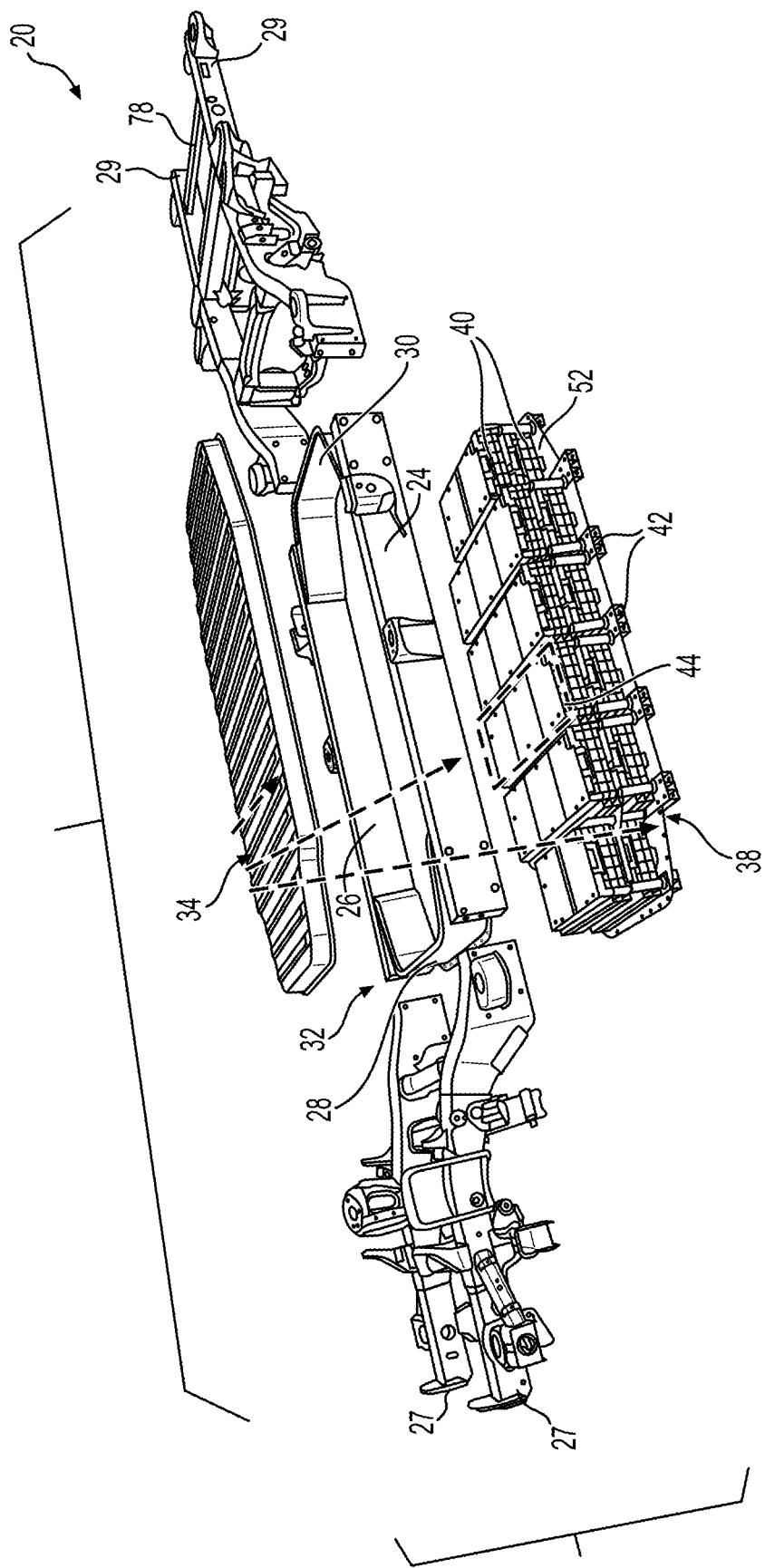
FIG. 10 is disassembled view of the frame assembly with the battery housing being partially assembled in accordance with the first embodiment.

FIGS. 9 and 10 provide a disassembled perspective view of the frame assembly 20 and battery housing 32. The cross-members 28, 30 may each include a U-shape configuration having a flat face 84 and a pair of angled legs 86. It should be appreciated that the U-shape may alternatively be a straight shape, C-shape, S-shape or any other shape. The battery modules 40 are arranged into rows 44 (FIG. 10). A series of lower brackets 88 sit on top and are connected to the plate 46 that separate the rows 44 in the lower level 40B and support the panel 80. Similarly, a series of upper brackets 90 sit on top and are connected to the panel 80 that separate the rows 44 in the upper level 40A. The lower brackets 88 and upper brackets 90 may be superimposed over one another in the vertical direction and spaced by the panel 80. Similarly, the support beams 42 may also be superimposed in the vertical direction with the brackets 88, 90. As such, the support beams 42 and brackets 88, 90 may be stacked on top of each other to form a congruent supporting structure. The support beams 42, the lower brackets 88, and upper brackets 90 may also be connected via fasteners. FIG. 10 is a disassembled view of the frame assembly 20 with the battery housing 32 being partially assembled. The front frame rails 27 and the rear frame rails 29 extend from opposite sides of each longitudinal beam 24, 26.

Figure 11:
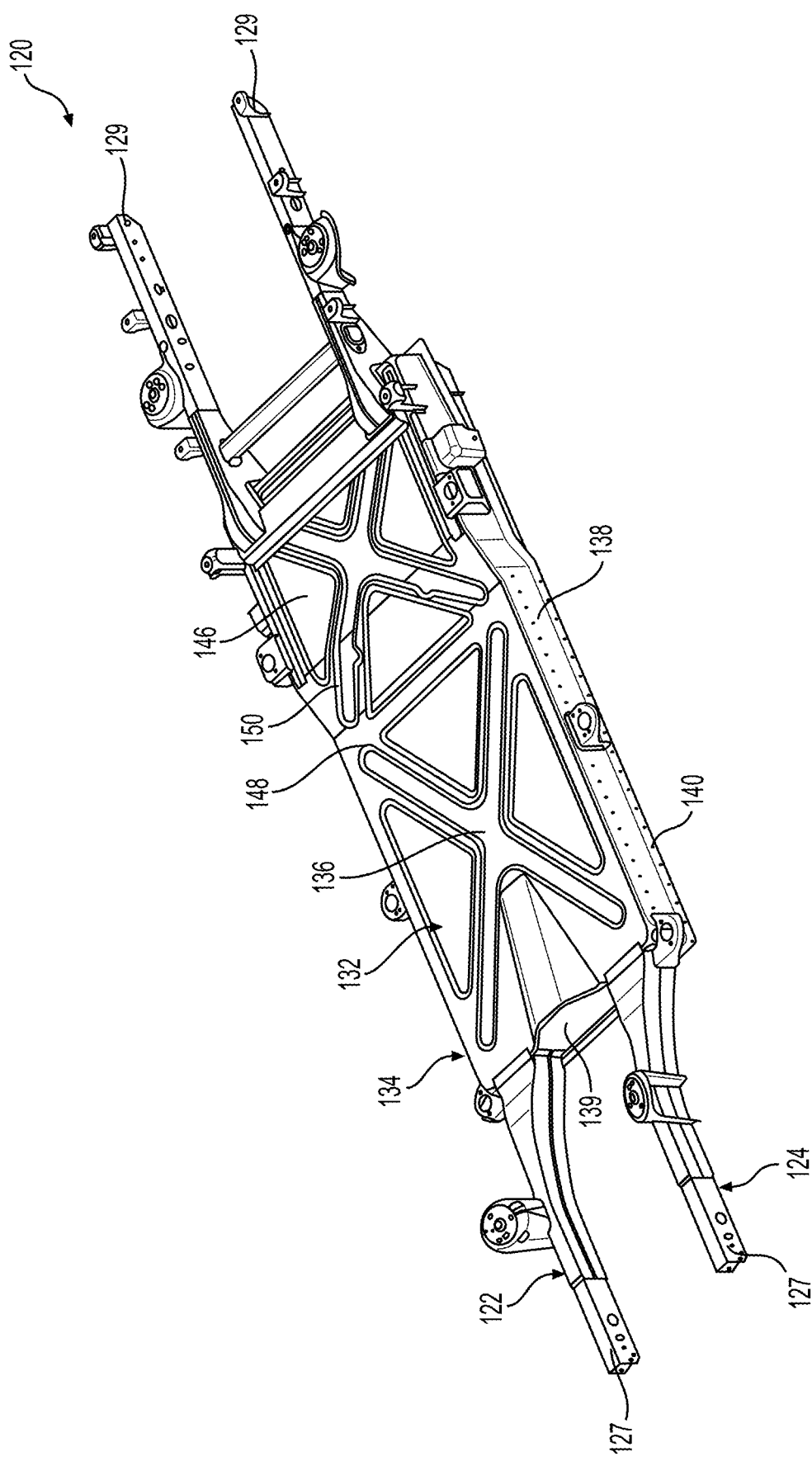
FIG. 11 is a top perspective view of the frame assembly for an automobile in accordance with a second embodiment.
Figure 12:
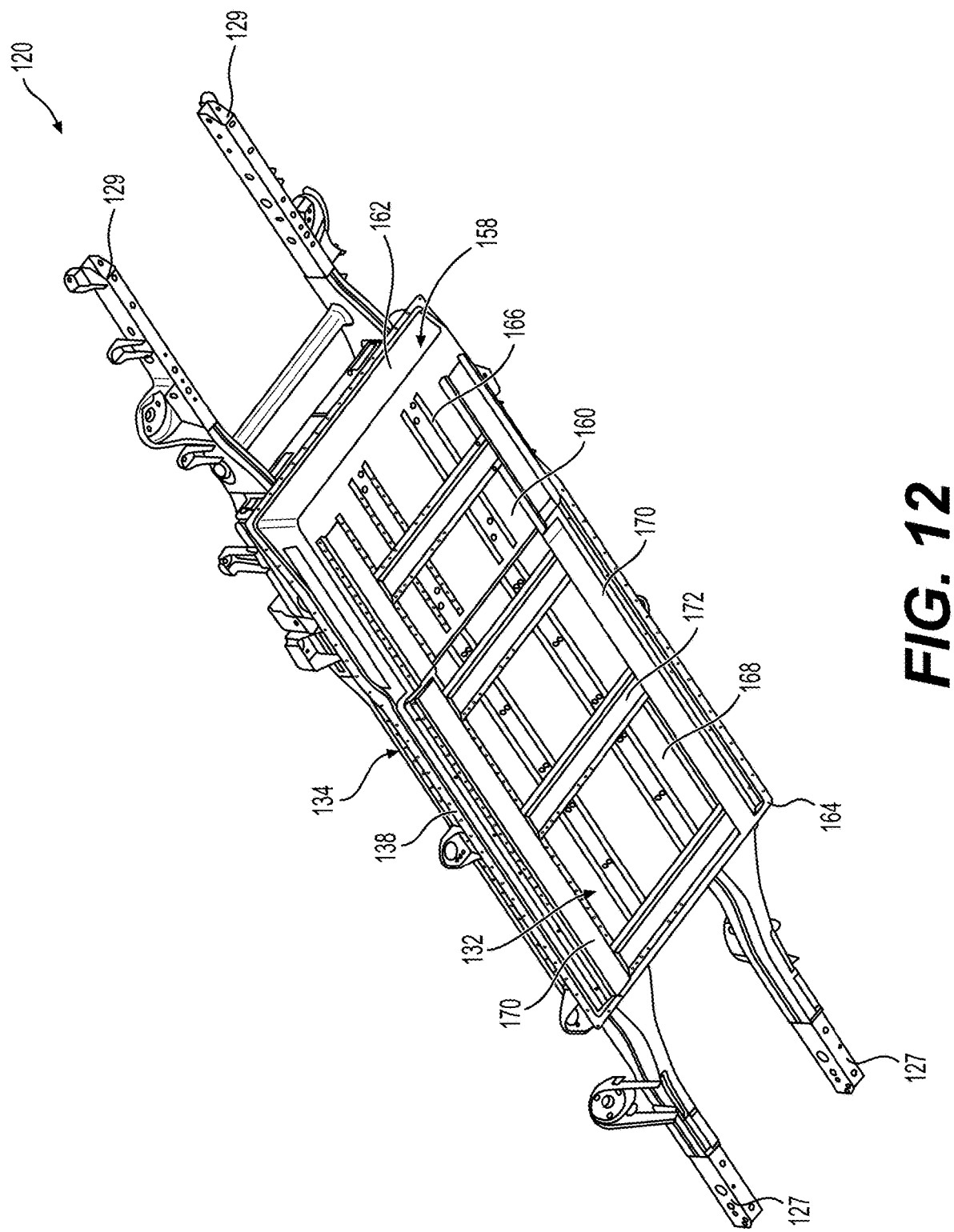
FIG. 12 is a bottom perspective view of the frame assembly in accordance with the second embodiment.

FIGS. 11 through 15 provide a second embodiment of the frame assembly 120. Unless otherwise indicated, the second embodiment may include the structures features and elements of the other embodiments described herein. Referring initially to FIGS. 11 and 12, the frame assembly 120 includes a pair of front frame rails 127 and a pair of rear frame rails 129 spaced by a battery housing 132. The battery housing includes an upper cover 134 that is directly and permanently connected (integral) to the front and rear rails 127, 129. The upper cover 134, may be generally rectangular and similar in size to the afore described upper cover 34. The upper cover 134 may comprise or primarily comprise one stamped piece of metal material.

Figure 13:
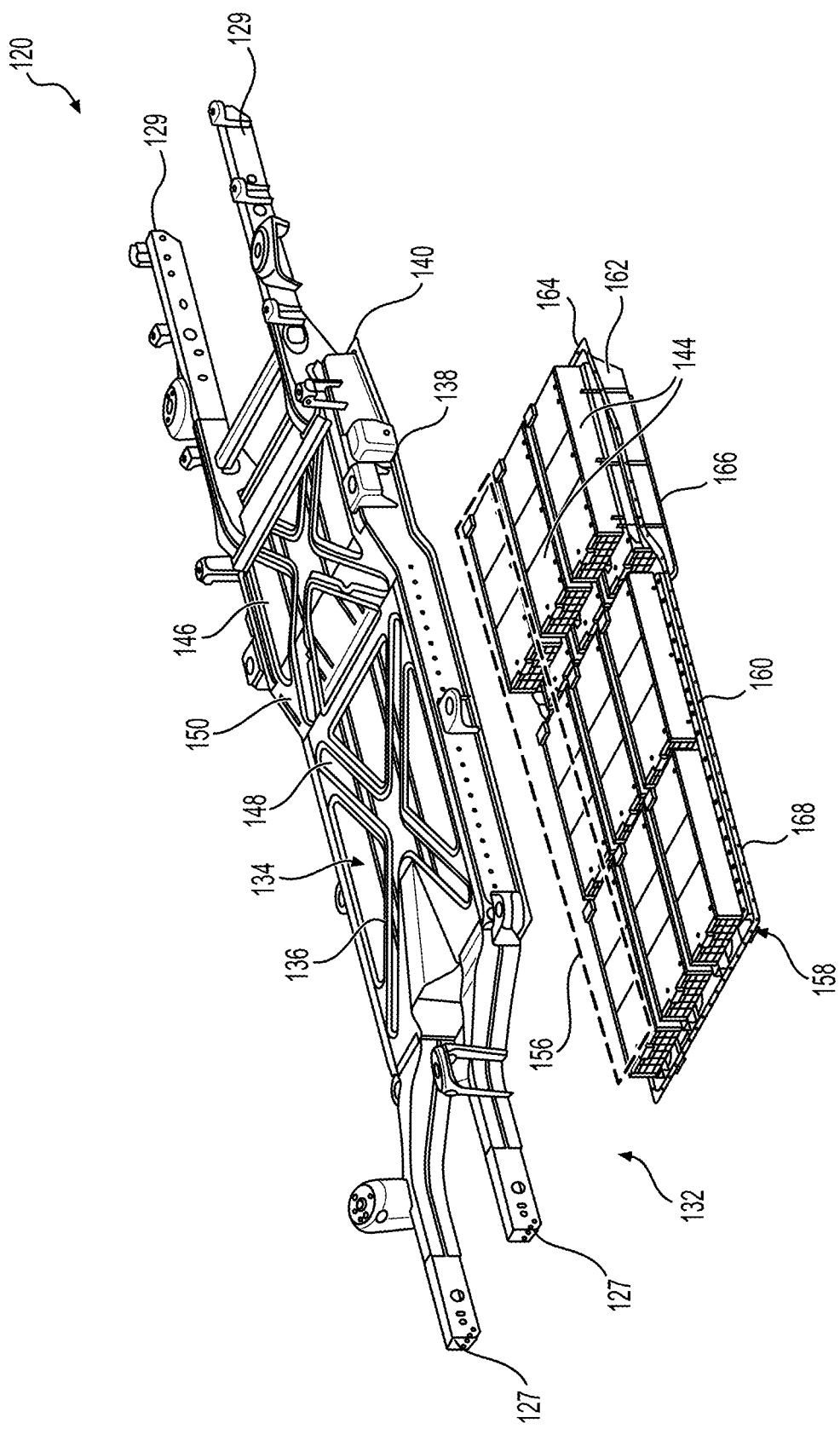
FIG. 13 is a is a top perspective view of the frame assembly in an open position in accordance with the second embodiment.

The upper cover 134 includes a roof portion 136 that is flush with an upper surface of the front and rear rails 127, 129. A pair of longitudinal sidewalls 138 and cross sidewalls 139 extend downwardly from the roof portion 136 to a connection flange 140. The sidewall 138 and the roof portion 136 define an upper pocket 142 wherein a series of battery modules 144 may be at least partially enclosed. The upper cover 134 may connect to the front and rear rails 127, 129 via fasteners, welding, adhesives, portions of both that have been stamped or otherwise from a singular piece of material (such as stamping), etc. As best shown in FIG. 13, the roof portion 136 of the upper cover 134 includes a raised surface 146 that is adjacent and connected to one of the front and rear rails 127, 129 and a lower surface 148 that is adjacent and connected to the other of the front and rear rails 127, 129. In the illustrated example, the raised surface 146 is adjacent and connected to the rear rails 129. The raised surface 146 is at a higher elevation than the lower surface 148 and connected thereto with an angled transition surface 150. The raised surface 146 is sized to accommodate at least one row of vertically stacked battery modules 144.

Figure 14:
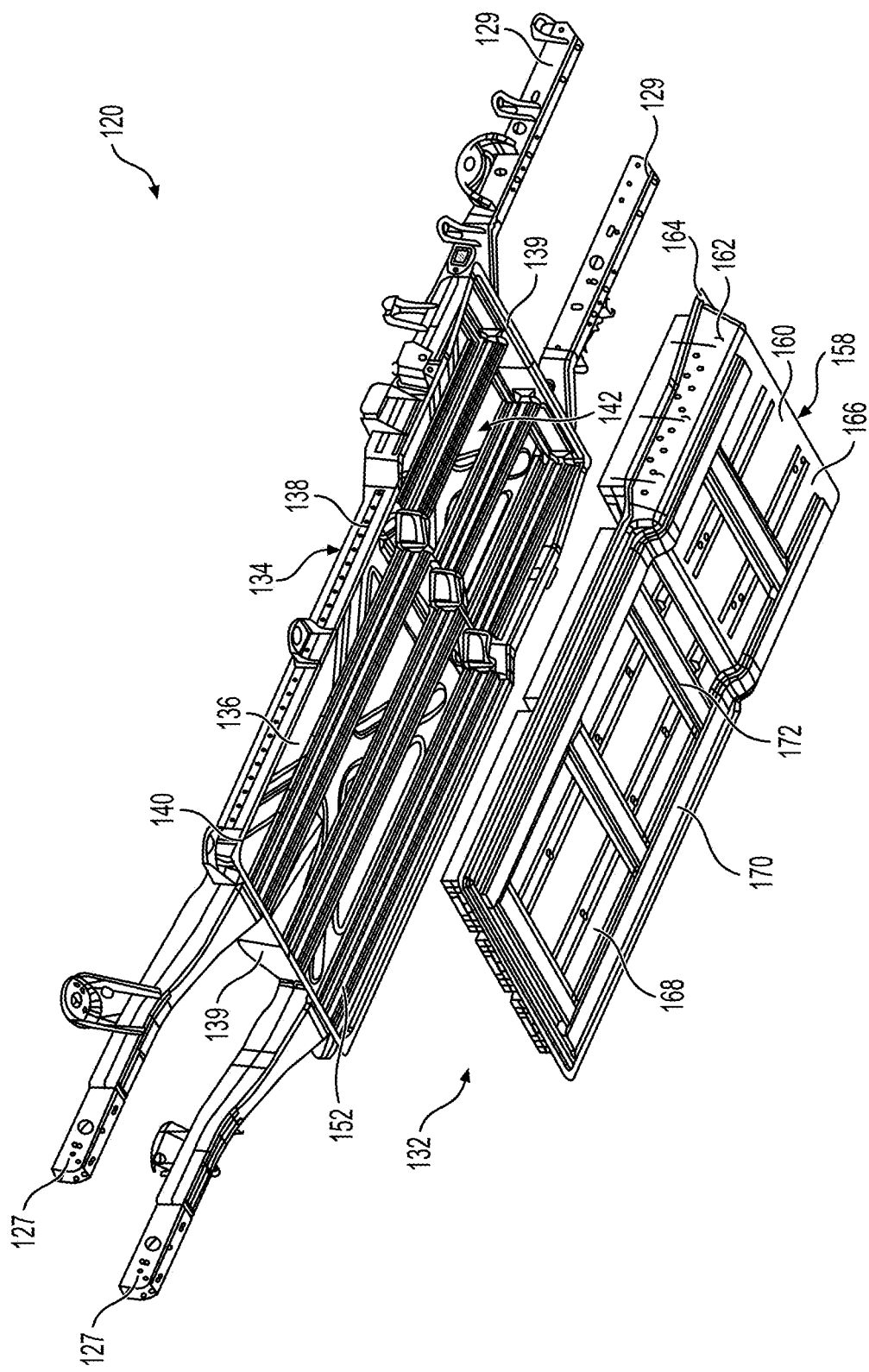
FIG. 14 is a bottom perspective view of the frame assembly in the open position in accordance with the second embodiment.
Figure 15:
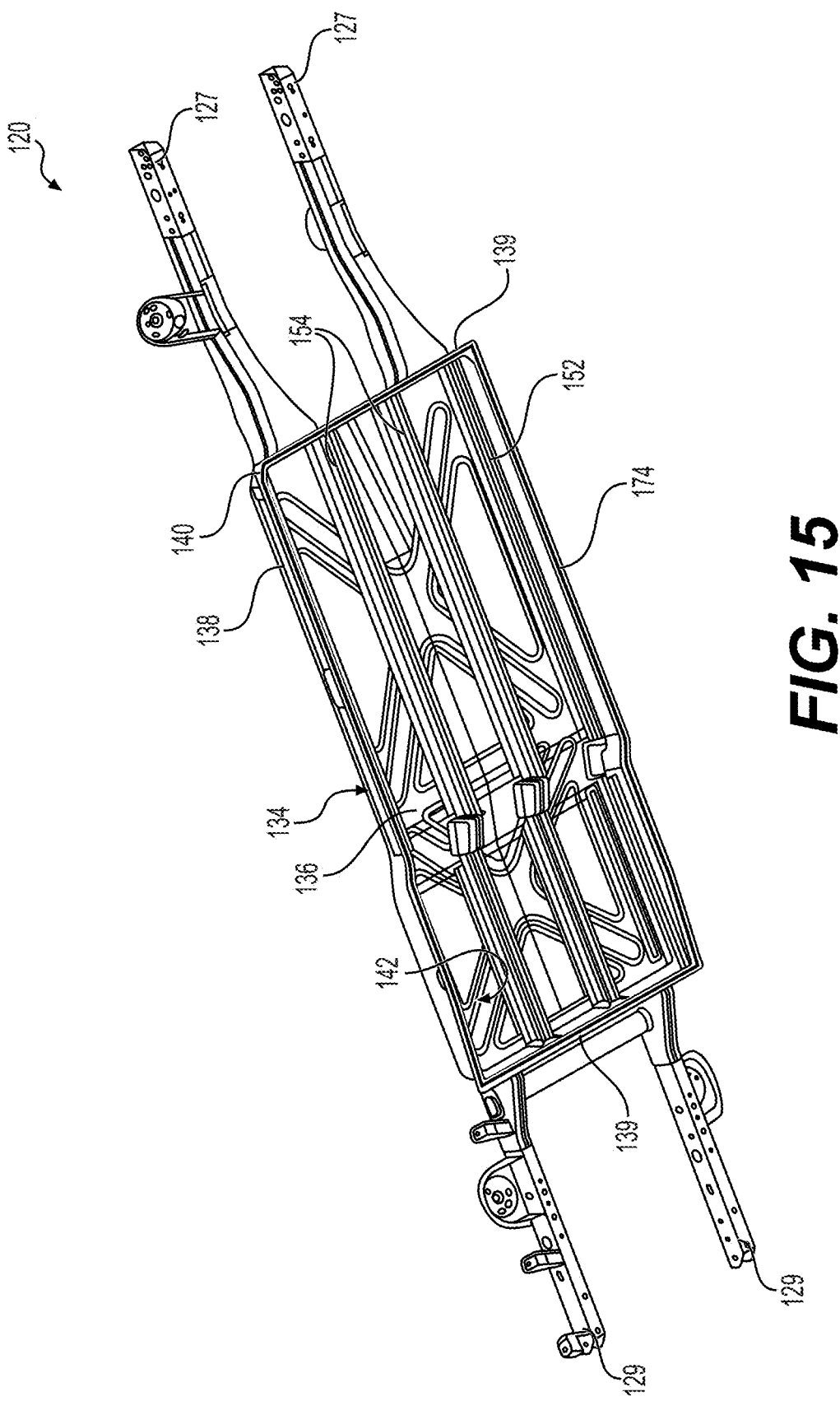
FIG. 15 is a is a bottom perspective view of a top shell of the battery housing in accordance with the second embodiment.

As best shown in FIGS. 14 and 15, at least one reinforcement member 152 extends through the upper pocket 142 between cross sidewalls 139 and parallel to the longitudinal sidewalls 138. In the illustrated example, the at least one reinforcement member 152 includes a series of longitudinal reinforcement members that extend parallel to the front and rear rails 127, 129. More particularly, the at least one reinforcement member 152, includes a pair longitudinal reinforcement members 152 that are located along and contact opposite longitudinal sidewall 138 which may be formed of longitudinal beams 122, 124. The pair of longitudinal reinforcement members 152 extend between respective front and rear rails 127, 129 and may be integral with or otherwise connected directly thereto through the sidewall 138 e.g., the cross sidewalls 139. The configuration of the pair of longitudinal reinforcement members 152 provides similar functionality to the longitudinal beams 24, 26 from the frame of the first embodiment. The at least one reinforcement member 152 may further include intermediate reinforcement members 154 (FIG. 15) that extend between and in a parallel relationship to the longitudinal reinforcement members 152 for additional structural functionality. Each reinforcement member 152, 154 may contour the roof portion 136. The intermediate reinforcement members 154 are spaced such that they are located spaces between columns 156 (FIG. 13) of battery modules 144 and at least partially absorb fore-aft loading.

Referring now to FIGS. 12 through 14, the battery housing 132 further includes a base plate 158 that cradles the battery modules 144 and forms a lower half of the battery housing 132. The base plate 158 includes a plate 160 that the battery modules 144 sit on and a lip 162 extends upwardly from the plate 160 to a flange 164. The plate 160 includes a lower surface 166 and an upper surface 168, wherein the lower surface 166 is at a lower elevation than the upper surface 168. In use, the lower surface 166 is deeper to accommodate a row of vertically stacked battery modules 144. At least one support beam 170 is located on an exterior surface of the base plate 158. The at least one support beam 170 includes a pair of oppositely spaced longitudinal support beams 170 that follow the contour of the plate 160 (e.g., the lower surface 166 and the upper surface 168) and provides similar functionality to the longitudinal beams 24, 26 from the frame of the first embodiment. The at least one support beam 170 may further include a series of transverse support beams 172 that extend between the longitudinal support beams 170. The series of transverse support beams 172 may include at least one transverse support beam 172 that extends across the lower surface 166 and at least one transverse support beam 172 that extends across the upper surface 168. In some embodiments, there are more transverse support beams 172 located across the upper surface 168 than the lower surface 166. The at least one support beam 170 thus serves to hold the weight of the battery while also providing substantial structural support to the frame. The transverse support beams 172 may be located centrally under each row of battery modules 144.

When assembled, the flange 140 on the upper cover 134 contacts the flange 164 on the base plate 158 and the respective flanges 140, 164 may be connected via fasteners, welding, adhesives, or connection features, or combinations thereof. A seal 174 (FIG. 15) may be located between respective flanges 140, 164 to completely seal the housing 132, such that the battery modules 144 are protected from the outside environment. In the illustrated embodiment, the respective flanges 140, 164 are connected with fasteners such that the base plate 158 can be removed from the upper cover 134 for serviceability. When the flanges 140, 164 are aligned, the lower surface 166 of the base plate 158 aligns with the raised surface 146 of the upper cover 134 such that the vertically stacked battery modules 144 are completely enclosed. Similar apertures and connections ports may be incorporated into the sidewall 138, longitudinal reinforcement members 152, or combinations thereof.

Figure 16:
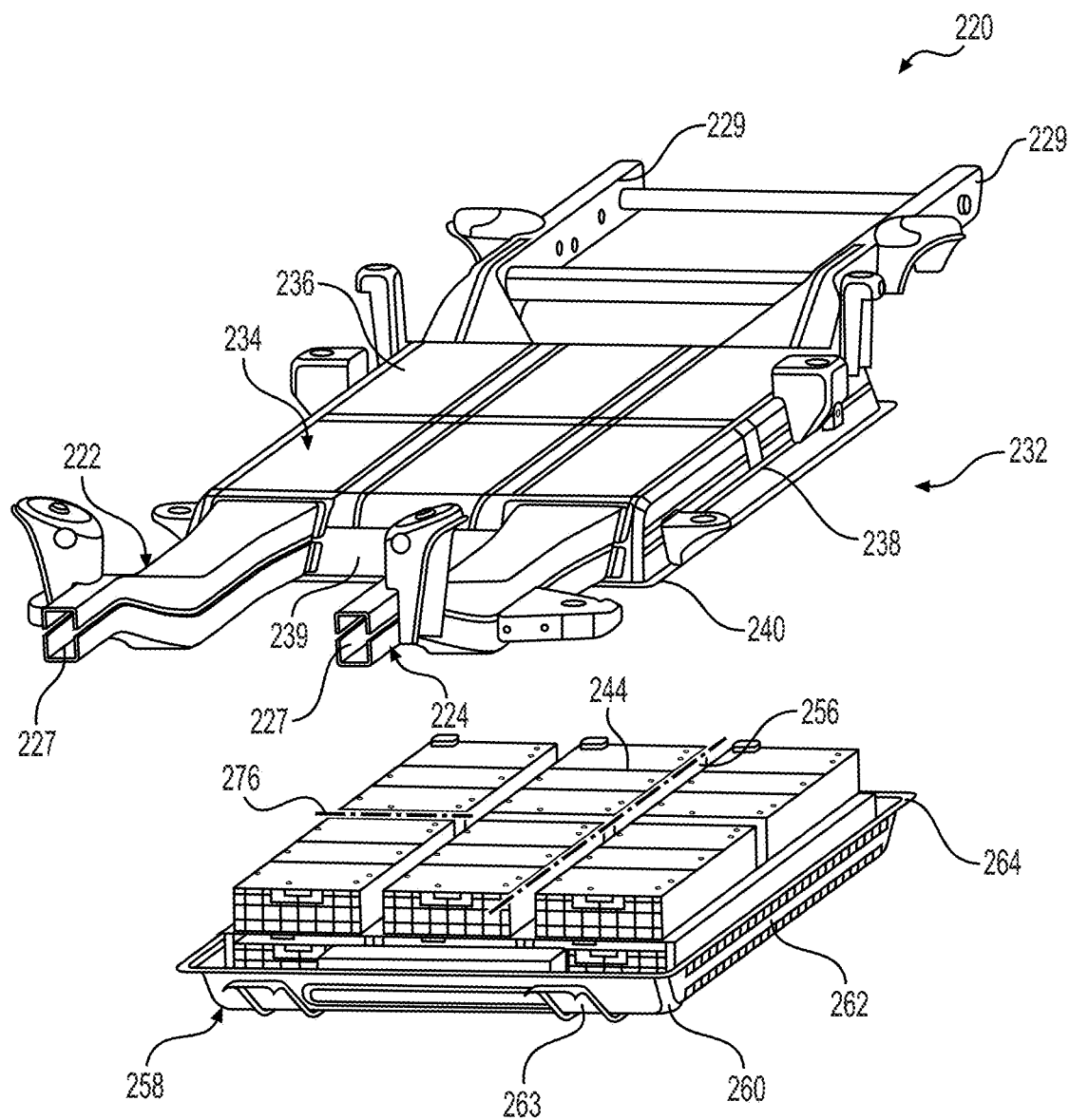
FIG. 16 is a is a top perspective view of the frame assembly for an automobile in accordance with a third embodiment.
Figure 17:
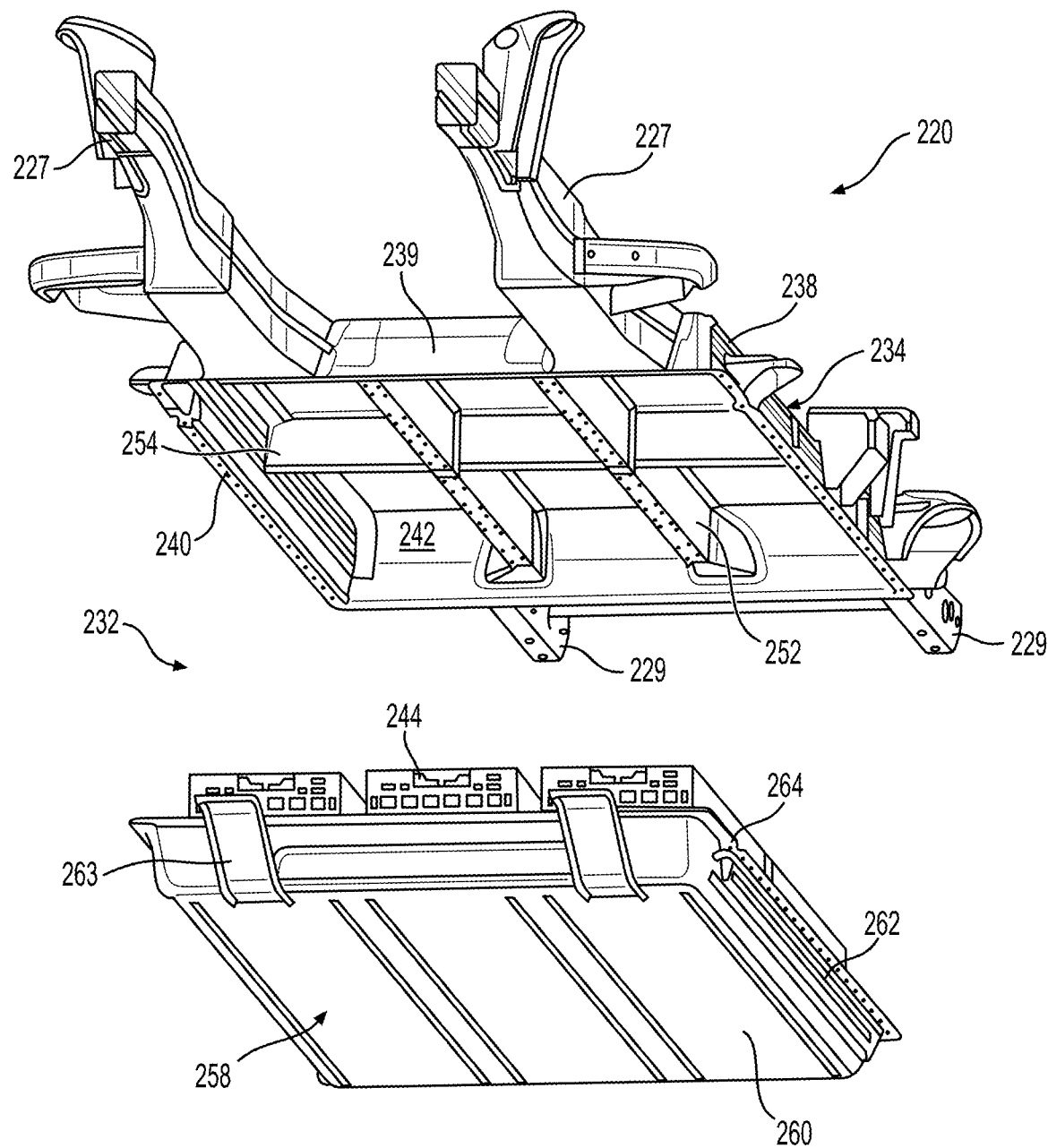
FIG. 17 is a bottom perspective view of the frame assembly in accordance with the third embodiment.
Figure 18:
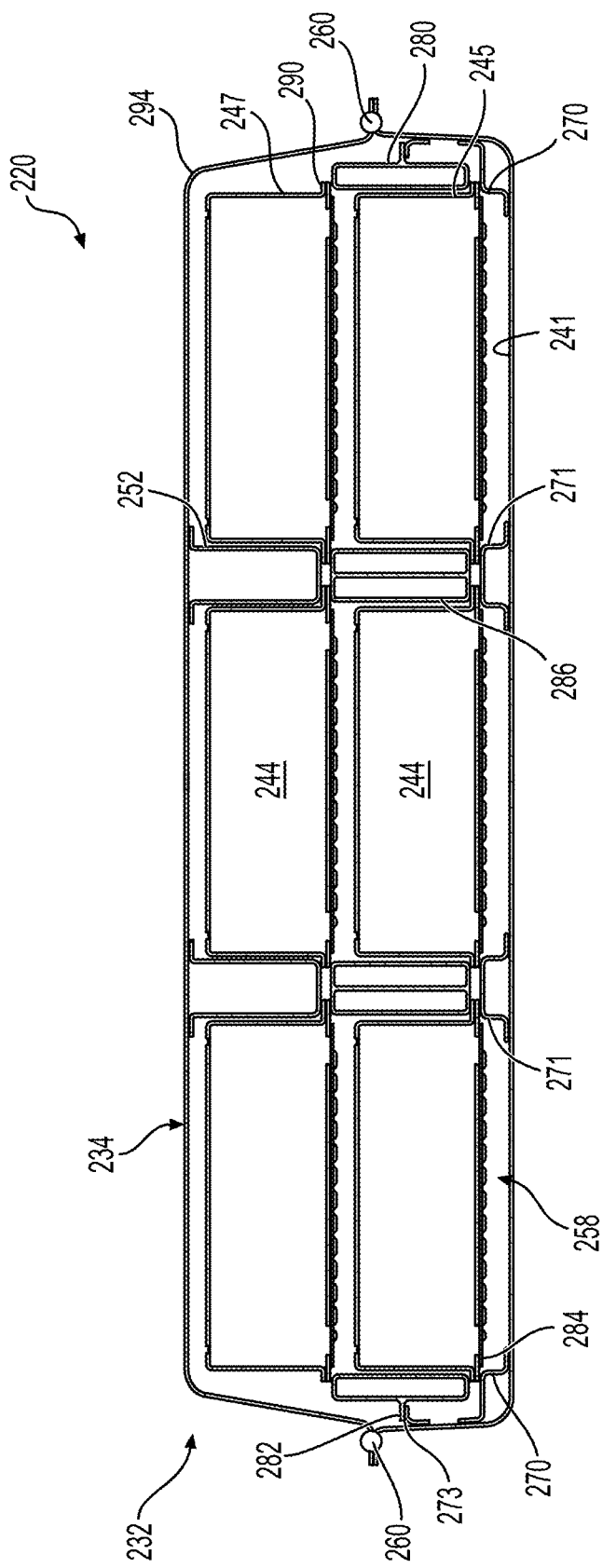
FIG. 18 was a cross-sectional view of the frame assembly in accordance with the third embodiment.

FIGS. 16 through 18 provide a third embodiment of the frame assembly 220. Unless otherwise indicated, the third embodiment may include the structures features and elements of the other embodiments described herein. The frame assembly 220 includes a pair of longitudinal beams 222, 224 extending between a pair of front frame rails 227 and a pair of rear frame rails 229 spaced by a battery housing 232. The battery housing includes an upper cover 234 that is directly and permanently connected (integral) to the front and rear rails 227, 229. The upper cover 234 may be generally rectangular and flat. The upper cover 234 may comprise or primarily comprise one stamped piece of metal material.

The upper cover 234 includes a top surface 236 that is planar. At least one sidewall may include a pair of longitudinal sidewalls 238 and cross sidewalls 239 extending downwardly from the top surface 236 to a connection flange 240. The sidewall 238, cross sidewalls 239, and the top surface 236 define an upper pocket 242 wherein a series of battery modules 244 may be at least partially enclosed. The upper cover 234 may connect to the front and rear rails 227, 229 via fasteners, welding, adhesives, portions of both that have been stamped from a singular blank, or combinations thereof.

As best shown in FIGS. 16 and 17, at least one reinforcement member 252 extends through the upper pocket 242 between cross sidewalls 239 and parallel to the longitudinal sidewalls 238. In the illustrated example, the at least one reinforcement member 252 includes a series of longitudinal reinforcement members that extend parallel to the longitudinal sidewalls 238. More particularly, the at least one reinforcement member 252, includes a pair longitudinal reinforcement members 252 that are located in a spaced relationship to opposite longitudinal sidewalls 238. The pair of longitudinal reinforcement members 252 extend between respective front and rear rails 227, 229 and may be connected directly thereto through the sidewall 238 or connected through intermediary cross sidewalls 239. The configuration of the pair of longitudinal reinforcement members 252 provides similar functionality to the longitudinal beams as described herein. The at least one reinforcement member 252 may further include cross reinforcement members 254 that extend between longitudinal sidewalls 238 and in a parallel relationship to the cross sidewalls 239 for additional structural functionality. Each reinforcement member 252, 254 contours to the top surface 236. The longitudinal reinforcement members 254 are spaced such that they slot in spaces between columns 256 (FIG. 16) of battery modules 244 and at least partially absorb fore-aft load thereof. Similarly, the cross reinforcement members 254 are spaced such that they slot in spaces between rows 276 (FIG. 16) of battery modules 244 and at least partially absorb side-to-side load thereof.

The battery housing 232 further includes a base plate 258 that cradles the battery modules 244 and forms a lower half of the battery housing 232. The base plate 258 includes a plate 260 that the battery modules 244 sit on and a lip 262 extends upwardly from a peripheral edge of the plate 260 to a flange 264.

As best illustrated in FIG. 18, at least one support beam 270 (FIG. 18) is located on an interior surface 241 of the base plate 258. The at least one support beam 270 includes a pair of oppositely spaced outer longitudinal support beams 270 adjacent to the longitudinal sidewalls 238 that provide similar functionality to the longitudinal beams as described herein. The at least one support beam 270 may further include central longitudinal support beams 271 spaced inwardly and in a parallel relationship to the outer longitudinal support beams 270. The at least one support beam 270 thus serves to hold the weight of the battery while also providing substantial structural support to the frame. The at least one support beam 270 further spaces the battery modules 244 from the plate 260 in the event of water entering the battery housing 232. The battery modules 244 may be stacked on top of one another in a bottom row 245 and a top row 247. The bottom row 245 includes outer support beams 280 that each include connection flanges 282 corresponding to connection flanges 273 in the base plate 258. A lower plate 284 extends between the outer support beams 280 and rests on top of the outer and inner longitudinal support beams 270, 271. The lower plate 284 may include apertures for drainage. The bottom row 245 further includes intermediate support beams 286 located between columns 256 that extend from the lower plate 284 above a top surface of the bottom row 245.

With continued reference to FIG. 18, the top row 247 includes a top plate 290 that rests on top of the outer support beams 280 and the intermediate support beams 286. The reinforcement members 252 contact an upper surface of the top plate 290 adjacent to the intermediate support beams 286 that contact a bottom surface of the top plate 290. The upper cover 234 may include reinforcement material 294 located on opposite corners. The reinforcement material 294 may include welded sheeting or materials otherwise connected thereto. A seal 260 may be located between the upper cover 234 and the base plate 258. The respective flanges are connected with fasteners such that the base plate 258 can be removed from the upper cover 234 for serviceability.

Figure 19:
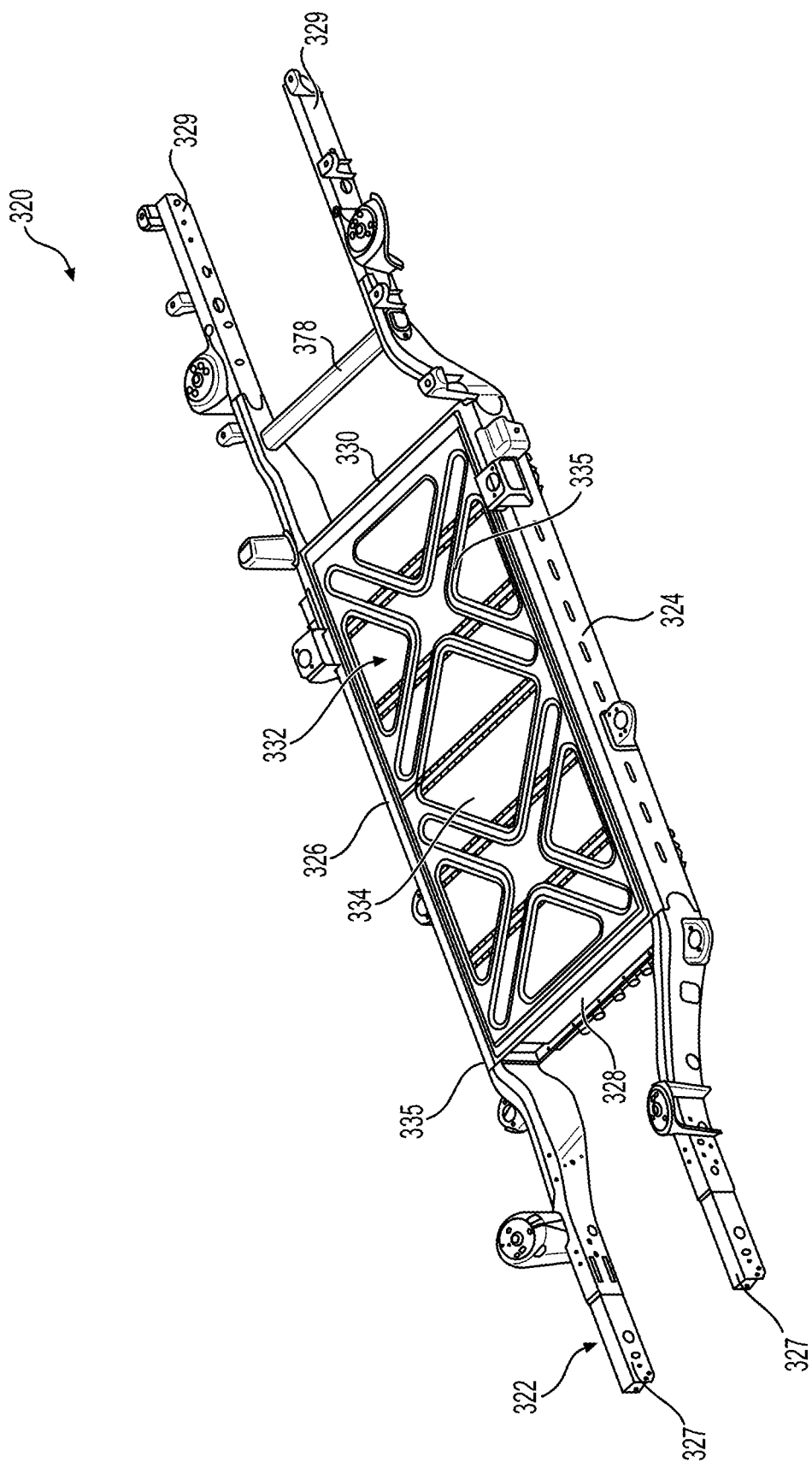
FIG. 19 is a top perspective view of a frame assembly for an automobile in accordance with a fourth embodiment.
Figure 20:
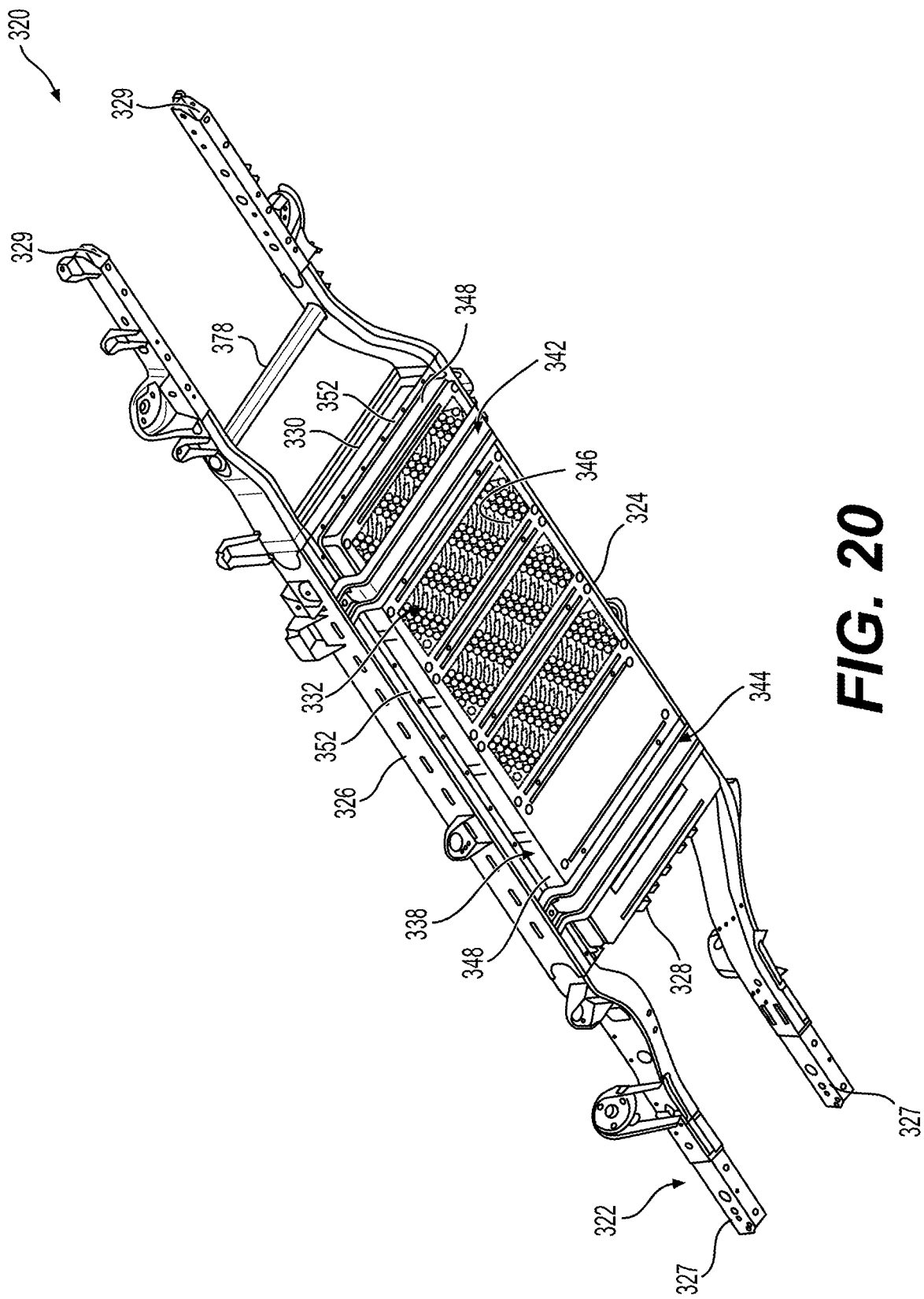
FIG. 20 is a bottom perspective view of the frame assembly in accordance with the fourth embodiment.
Figure 22:
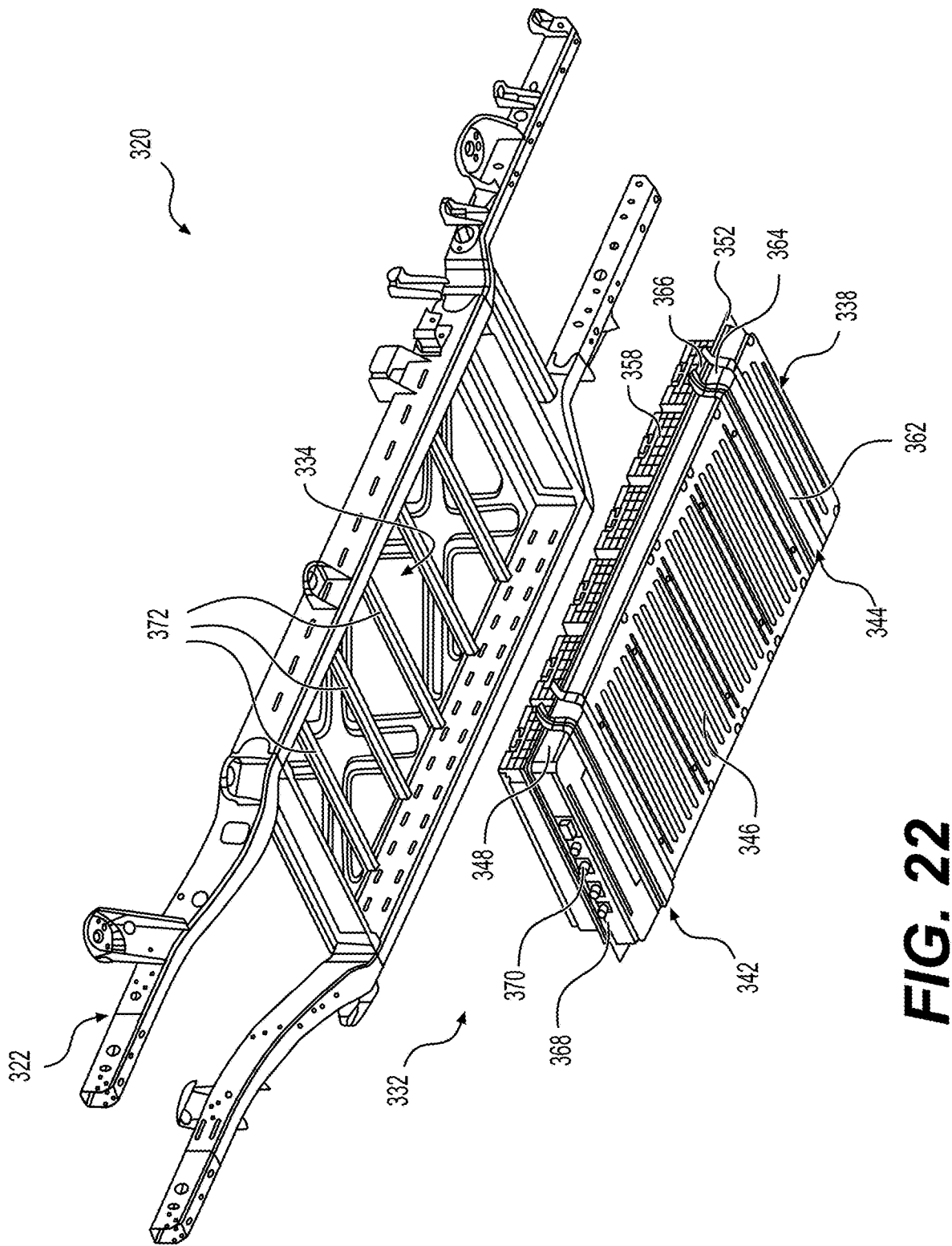
FIG. 22 is a bottom perspective view of the frame assembly in the open position in accordance with the fourth embodiment in accordance with the fourth embodiment.

FIGS. 19 and 20 provide a fourth embodiment of the frame assembly 320. Unless otherwise indicated, the fourth embodiment may include the structures features and elements of the other embodiments described herein. The frame assembly 320 includes a battery housing 332 at least partially integral with an automobile frame 322. The frame 322 includes a pair of longitudinal beams 324, 326 (or rails) that each extend between a front frame rail 327 and a rear frame rail 329. The frame 322 further includes at least one cross-member 328, wherein the pair of longitudinal beams 324, 326 are spaced apart by the at least one cross-member 328. The at least one cross-member may include a first cross-member 328 and a second cross-member 330. Spacing between the first and second cross-members 328, 330 and the longitudinal beams 324, 326 provides a location for the battery housing 332. More particularly, the battery housing 332 includes an upper cover 334 that extends between and is protected by the first and second cross-members 328, 330 and the longitudinal beams 324, 326. The upper cover 334 is permanently connected or integral to top portions of the first and second cross-members 328, 330 and the longitudinal beams 324, 326, such that an upper pocket 336 (FIG. 22) is formed along an underside of the upper cover 334. The upper cover 334 includes molded supports 335, which may form a cross or X shape for providing support in both the transverse (i.e., cross-car) and longitudinal (i.e., fore-aft) directions to the longitudinal beams 324, 326. The molded supports 335 may be thicker than the rest of the upper cover 334 or may be formed as raises from the same thickness. The battery housing 332 further includes a base plate 338 that is releasably connected or non-integral to the frame 322 and is formed to hold at least one but preferably a plurality of battery modules 340 (FIG. 22). The base plate 338 connects to lower portions of the of the first and second cross-members 328, 330 and the longitudinal beams 324, 326, to form a chamber 341 such that the battery modules 340 are completed enclosed within the chamber 341 and protected from the outside environment. At least one support beam 342, which may include a first support beam 342 and a second support beam 344, extends below the base plate 338 and connects to both longitudinal beams 324, 326 for providing support to the underside of the base plate 338. As such, the chamber 341 is formed by the upper cover 334, the base plate 338, the longitudinal beams 324, 326, and the first and second cross-members 328, 330, which completely enclose the battery modules 340.

Figure 21:
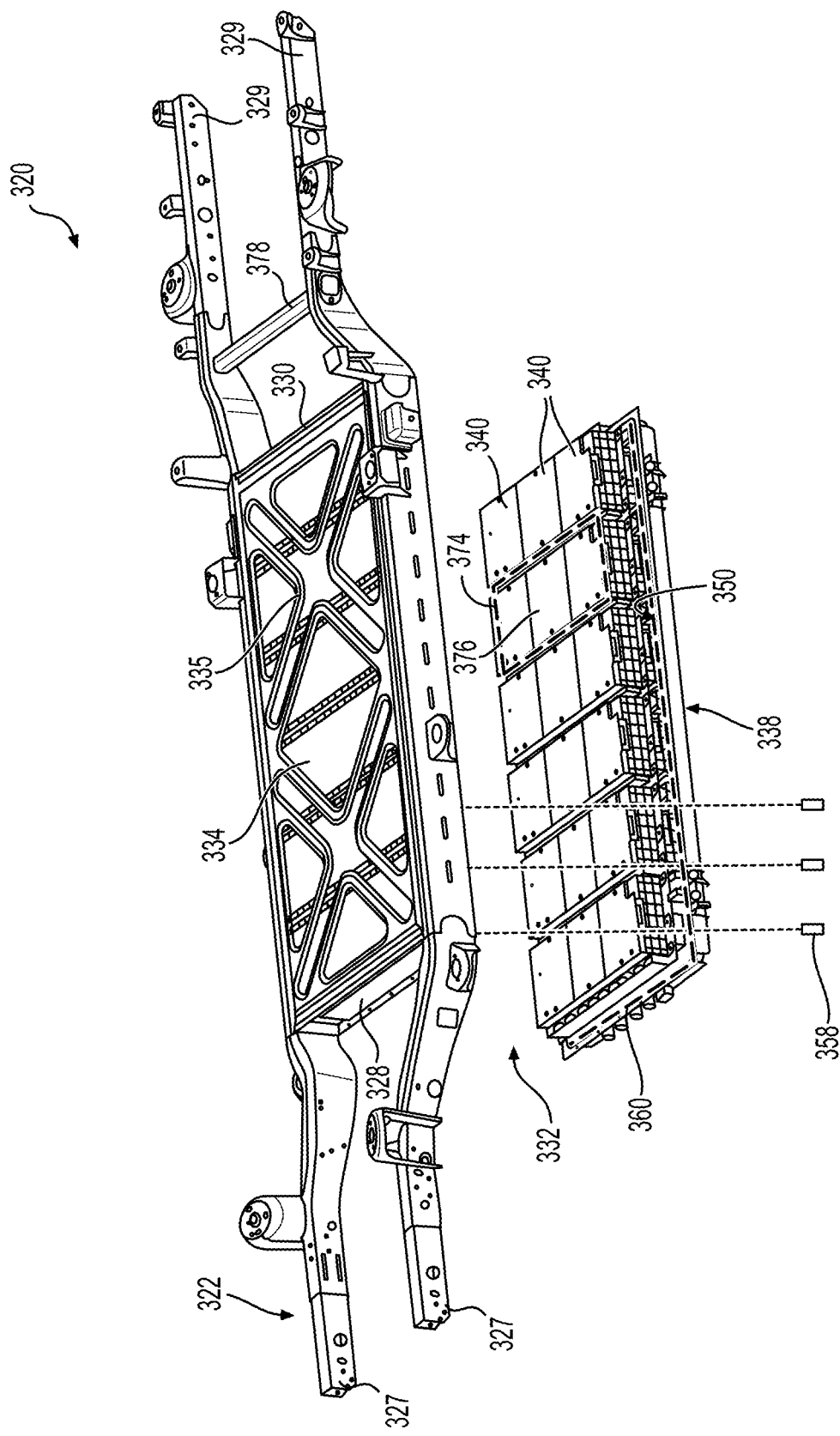
FIG. 21 is a top perspective view of the frame assembly in an open position in accordance with the fourth embodiment.

As best illustrated in FIGS. 21 and 22, the frame assembly 320 is shown in an open position. The base plate 338 includes a plate 346 and a lip 348 extending around a peripheral edge of the plate 346 that forms a lower pocket 350. The sidewalls extend from the plate 346 to a flange 352 that sits flush against the lower portions of the of the first and second cross-members 328, 330 and the longitudinal beams 324, 326. The flange 352 may be connected to the frame 322 via welding, fasteners, adhesives, or combinations thereof. In some embodiments, the flange 352 is releasably connected to the first and second support beams 342, 344 with fasteners 358 that extend through the flange 352 and into the lower portions of the first and second cross-members 328, 330 and the longitudinal beams 324, 326. One or more seals 360 (FIG. 24) may extend along the flange 352 to provide sealing contact when the base plate 338 is fastened to the frame 322. As best illustrated in FIG. 22, the first and second support beams 342, 344 each include a flat section 362 that corresponds to the plate 346 of the base plate 338, a pair of vertical sections 364 that correspond to the lip 348 of the base plate 338, and a lip section 366 that corresponds to the flange 352 of the base plate 338. A section of the lip 348 includes a series of apertures 368 and a series of electrical connections ports 370 extend through the apertures 368 for connecting the battery modules to the automotive electrical system.

Figure 23:
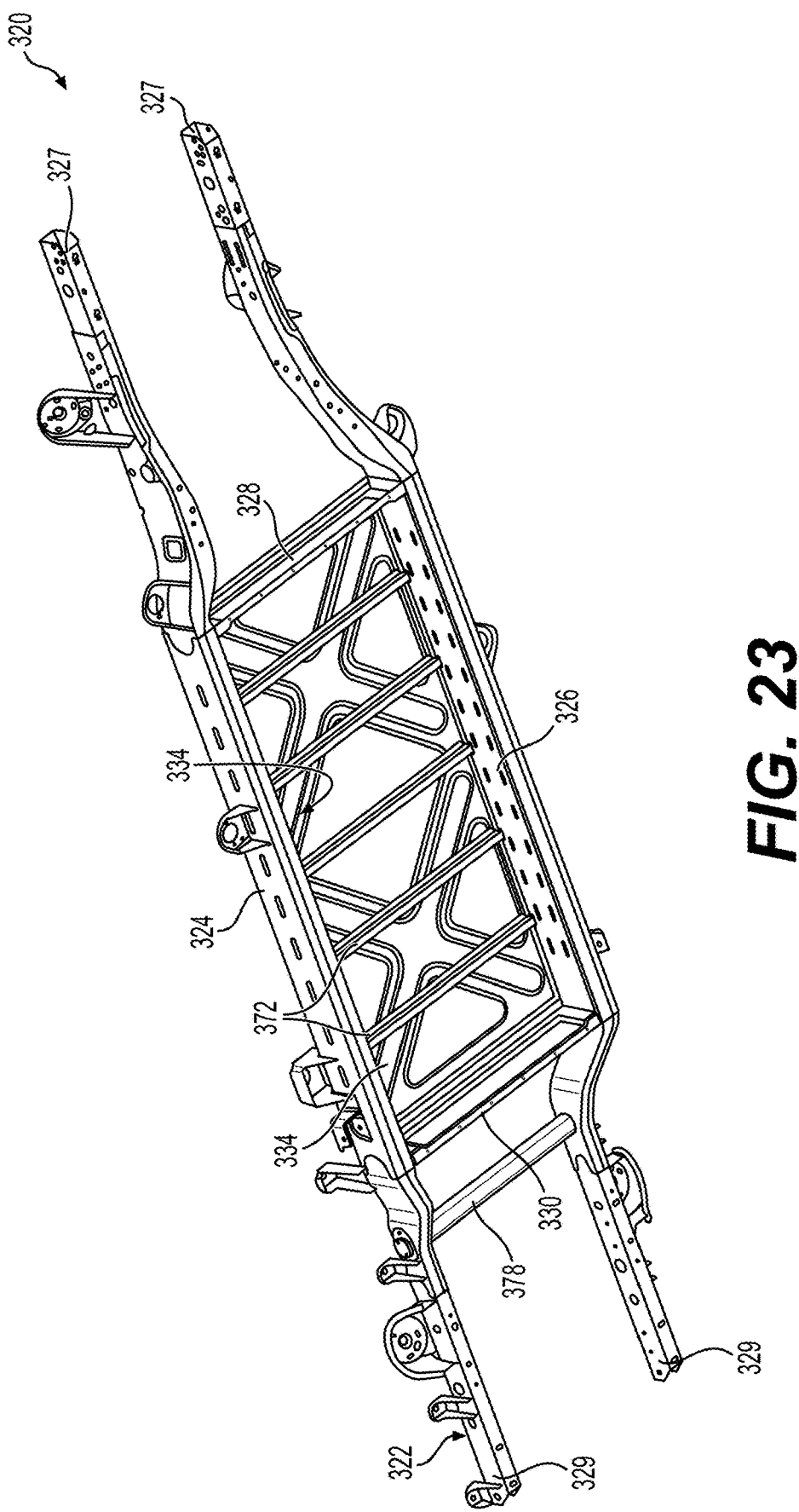
FIG. 23 is a bottom perspective view of a upper cover of the frame assembly including a plurality of cross-beams.

As best illustrated in FIGS. 22 and 23, at least one reinforcement member 372 extend between the longitudinal beams 324, 326 and connected along the upper cover 334. The reinforcement members 372 extend into the upper pocket 336. The reinforcement members 372 may be spaced such that they can be located in spaces 374 between rows 376 (FIG. 21) of battery modules 340 for absorbing side-to-side loading. A tubular cross-member 378 may further be included between the rear frame rails 329.

Figure 24:
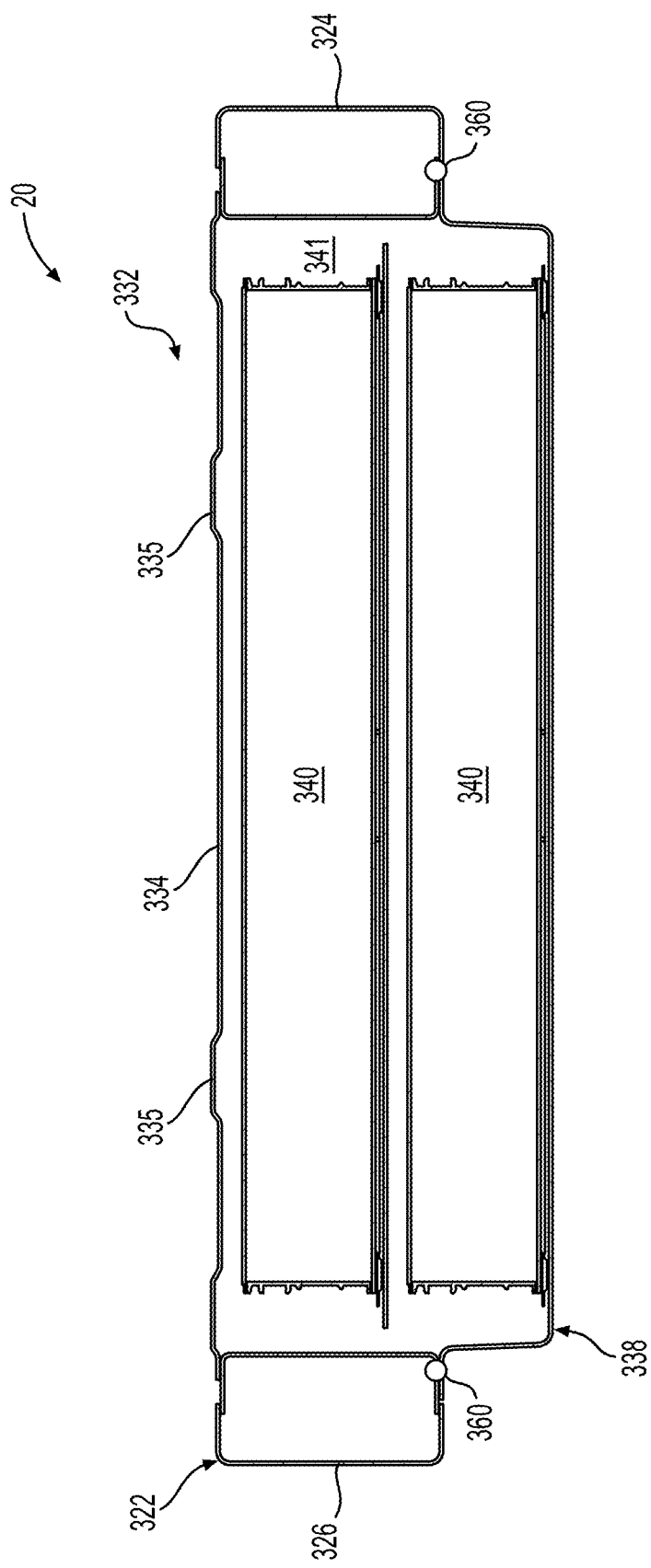
FIG. 24 is a cross-sectional view of the frame assembly in accordance with the fourth embodiment.

In use, the battery modules 340 sit at least partially within the lower pocket 350 of the base plate 338. The base plate 338 is then placed into contact with the frame 322 such that the battery modules 340 are also at least partially located in the upper pocket 336 and spaced in rows 376 between reinforcement members 372. More particularly, the flange 352 of the lip 348 is brought into connection with the lower portions of the first and second cross-members 328, 330 and the longitudinal beams 324, 326 and connected thereto with fasteners 358. The at least one support beam 342 is then placed under the base plate 338 and in contact with the longitudinal beams 324, 326 and connected thereto. The battery modules 340 are then completely enclosed between the base plate 338, the upper cover 334, side portions of the longitudinal beams 324, 326, and side portions of the cross-members 328, 330. The upper cover 334, the longitudinal beams 324, 326, the cross-members 328, 330, and the reinforcement members 372 all provide strength to the frame 322 as additional functionality in addition to enclosing and supporting the battery modules 340. A cross-section of vertically stacked battery modules 340 in the frame assembly 320 is illustrated in FIG. 24.

Figure 25:
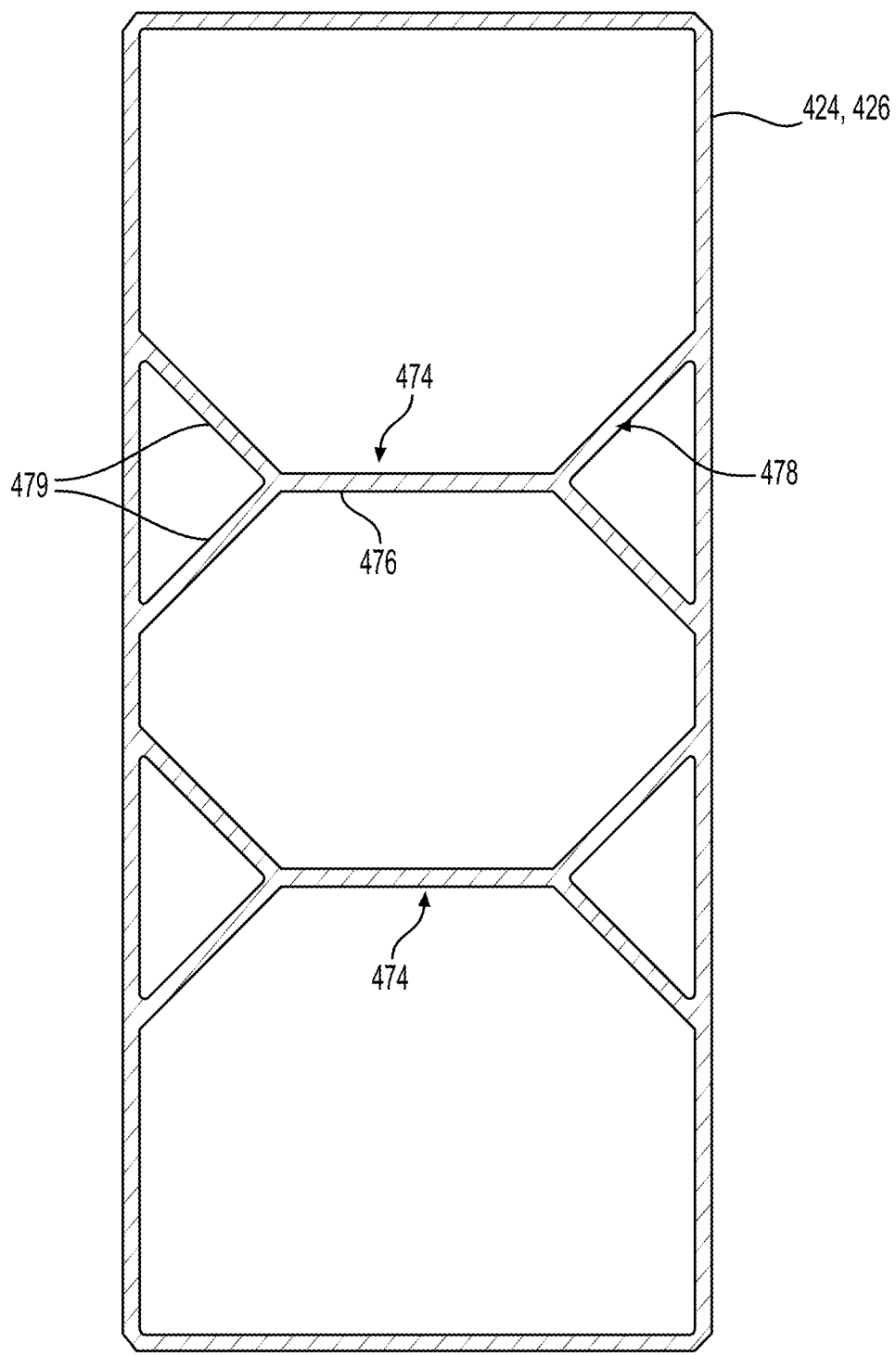
FIG. 25 is a cross-sectional view of a longitudinal beam having internal webbing and cells in accordance with one aspect of the disclosure.

FIG. 25 provides an enlarged cross-sectional view of the longitudinal beams 424, 426 and the structural webbing 474. Construction of the longitudinal beams 424, 426 may include an extrusion process, stamping process including hot stamping, roll forming, casting, etc. Construction of the longitudinal beams 424, 426 may be selected based upon the materials used and the desired shape and thickness. The configuration of the longitudinal beams may be included in longitudinal beams, cross-members, and other supporting structures described herein.

Figure 26:
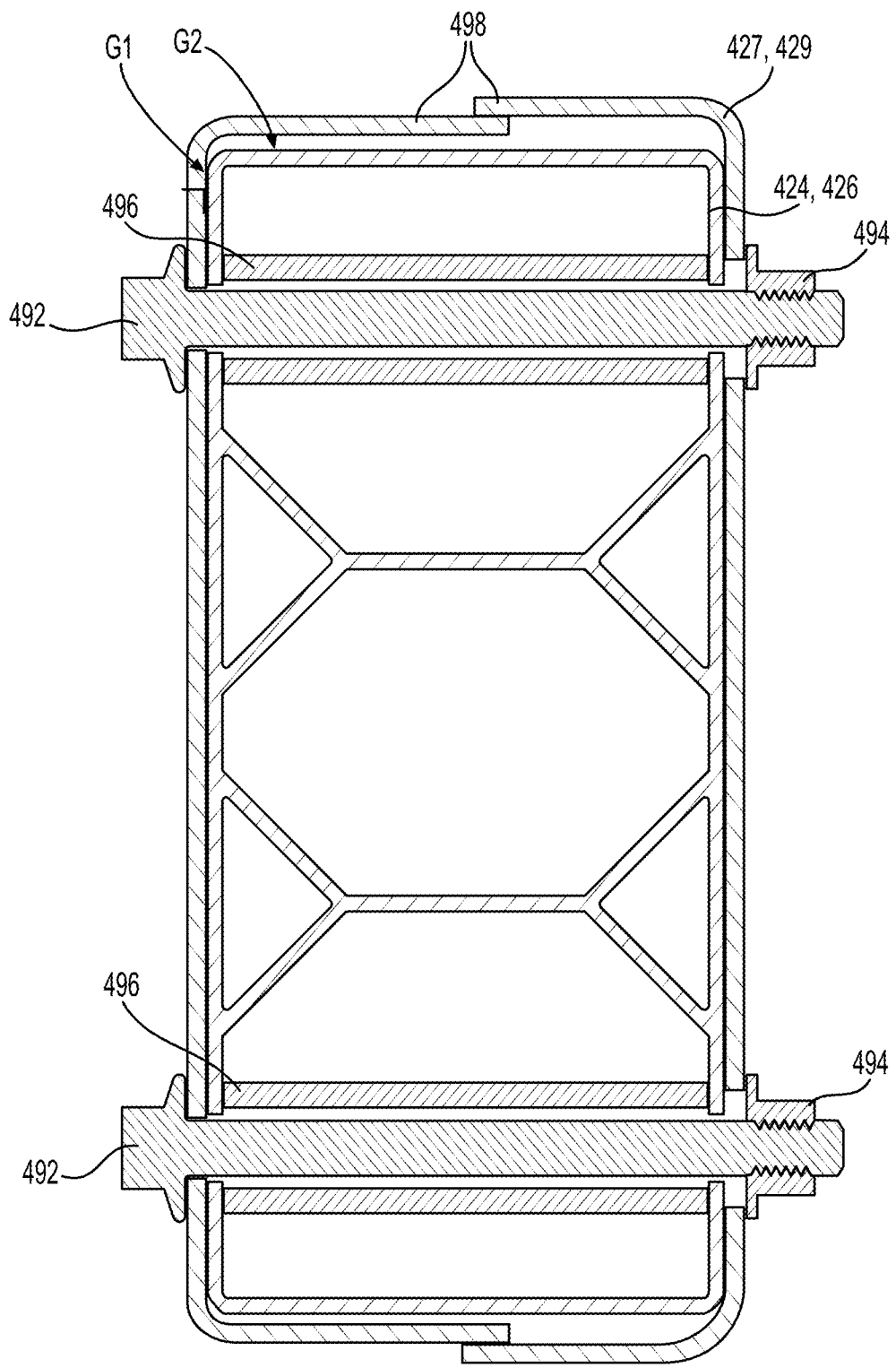
FIG. 26 is a cross-sectional view of the longitudinal beam connected to a front or a rear frame member in accordance with one aspect of the disclosure.

FIG. 26 provides another enlarged cross-sectional view of the longitudinal beams 424, 426 on a plane where it is connected to either the front frame rail 427 or the rear frame rail 429. As illustrated, the rails 427, 429 may be of similar cross-sectional shape to the longitudinal beams 424, 426 but slightly larger such that the longitudinal beams 424, 426 can be at least partially inserted therein. Connection between rails 427, 429 and longitudinal beams 424, 426 may include one or more fasteners 492 that extend through one of the rails 427, 429 and one of the longitudinal beams 424, 426 to a flange nut 494 whereat it may be tightened. A sleeve 496 extends across the hollowed longitudinal beams 424, 426. The rails 427, 429 may include a portion that is split with a pair of opposing sections 498 having a C-shape that can be expanded over a corresponding longitudinal beam 424, 426 before being clamped by fasteners 492. In some embodiments, the sections 498 may be connected to one another before introduction of the longitudinal beams 424, 426. The portion of the rails 427, 429 that overlap the longitudinal beams 424, 426 may be coated to prevent galvanic corrosion. A gap G1 may be located between the rails 427, 429 and the longitudinal beams 424, 426 in the cross-car direction. The gap G1 is adjusted to meet coating requirements and may be less than 3 mm, less than 2 mm, less than 1 mm, less than 0.70 mm, or less than 0.50 mm. A gap G2 may be located between the rails 427, 429 and the longitudinal beams 424, 426 in the vertical direction. The gap G2 is selected to meet coating requirements and may be larger than the gap G1, for example over 2 mm, over 3 mm, or 3.02 mm. The gap G2 may also be the less than 3 mm, less than 2 mm, less than 1 mm, less than 0.70 mm, or less than 0.50 mm. Selection of the gaps G1 and G2 may further account for tolerance requirements. The coating may include a non-metallic coating to prevent galvanic corrosion.

Figure 28:
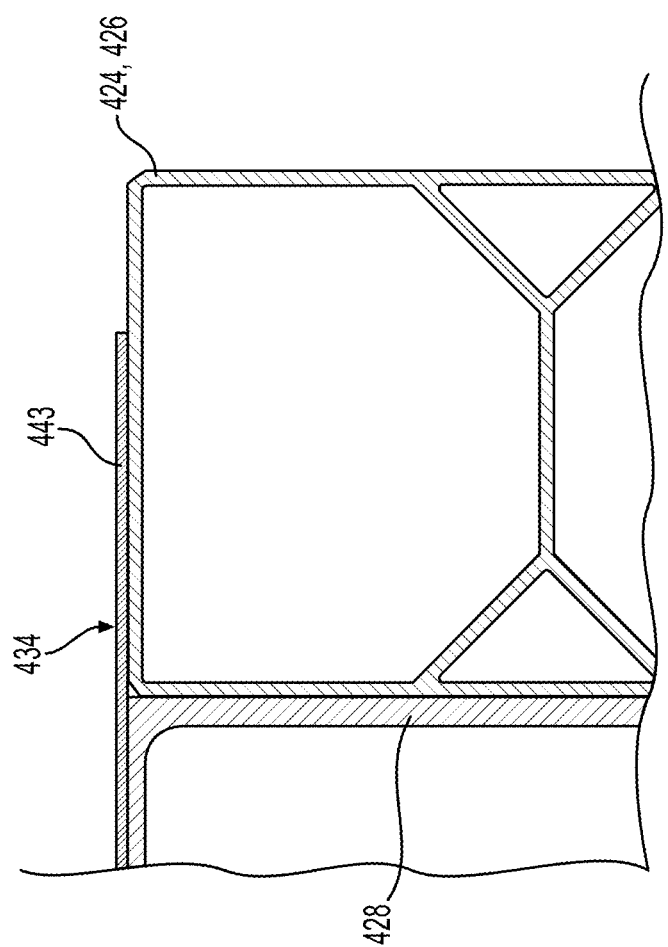
FIG. 28 is an enlarged cross-sectional view of the top portion of the battery housing connected to the front frame member in accordance with one aspect of the disclosure.
Figure 27:
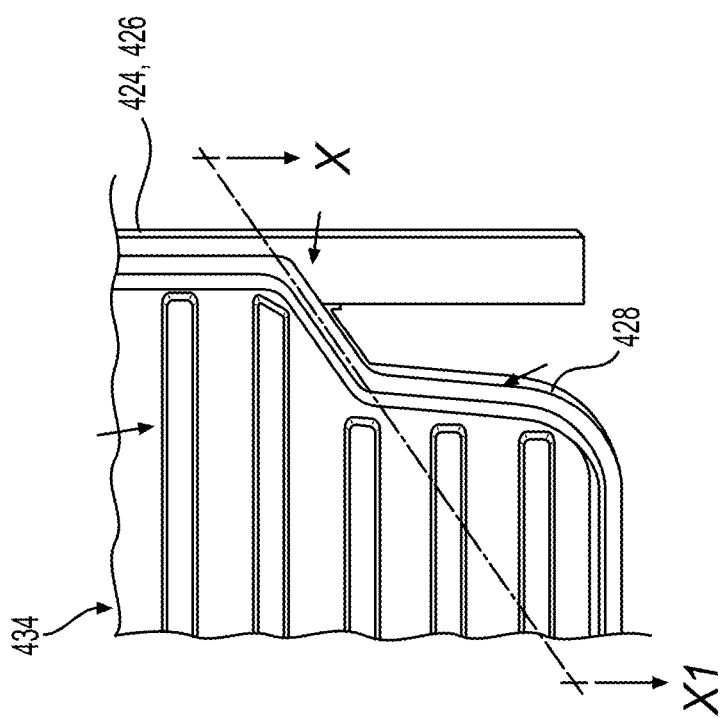
FIG. 27 is an enlarged view of a top portion of the battery housing in accordance with one aspect of the disclosure.

FIG. 27 is an enlarged view of the upper cover 434 extending over one of the cross-members 428, 430 and one of the longitudinal beams 424, 426. FIG. 28 is a cross-sectional view of FIG. 27 taken along line X, X1. During construction, the cross-members 428, 430 may be connected to the longitudinal beams 424, 426 via fasteners, welding or the like. Upper surfaces of the cross-members 428, 430 and the longitudinal beams 424, 426 are then machined before welding the upper cover 434 thereon.

Figure 29:
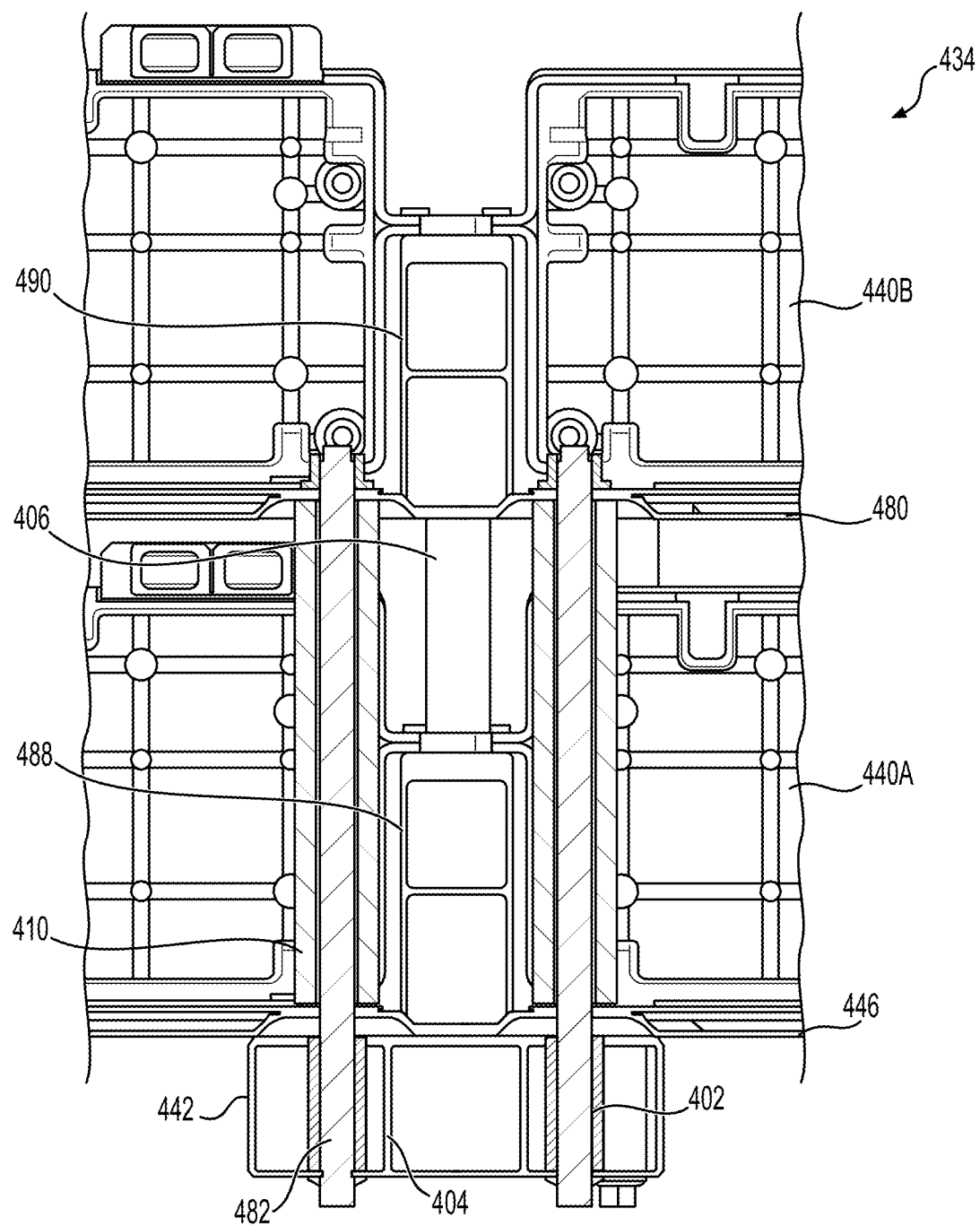
FIG. 29 is a cross-sectional view of a plurality of battery modules connected to the battery housing in accordance with one aspect of the disclosure.

FIG. 29 is an enlarged cross-sectional view of upper and lower levels 440A, 440B of the battery modules 440 connected to a battery housing 432. The bolts 482 may extend through support beams 442, a plate 446, and a panel 480. The bolts 482 include an upper sleeve 410 located between the plate 446 and the panel 480 and a lower sleeve 402 extends across the support beams 442. The support beams 442, the lower brackets 488, and the upper brackets 490 include structural webbings 404 and may be formed from an extrusion process. A spacer block 406 may be located between the lower and upper brackets 488, 490 to prevent compression between the plate 446 and the panel 480. In some embodiments, there are 12 battery modules total. A fastener may be located in the spacer block 406 for further connection between the lower and upper brackets 488, 490.

Figure 30:
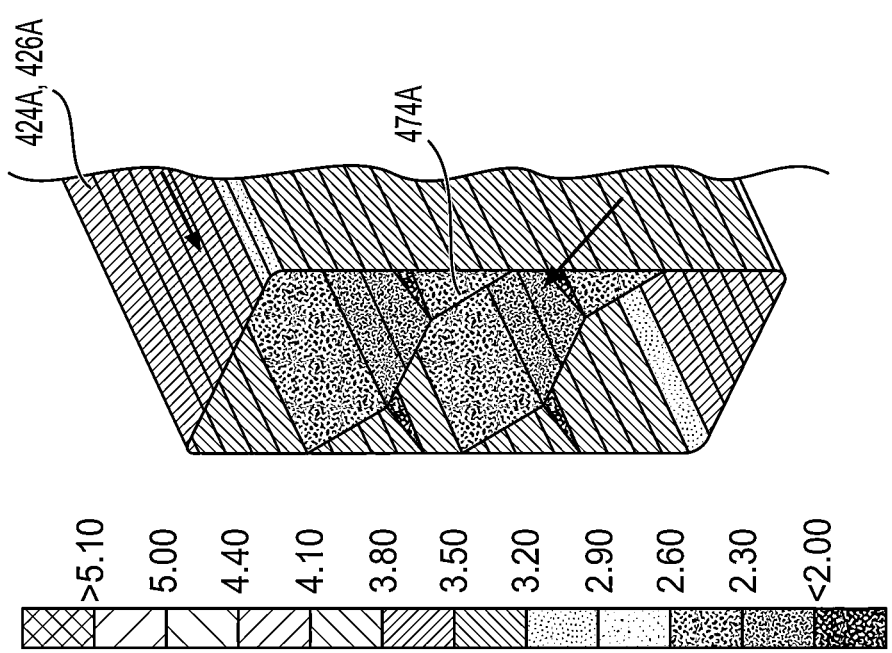
FIG. 30 is cross-sectional view of the longitudinal beam and the internal webbing having a constant thickness in accordance with one aspect of the disclosure.

FIG. 30 is a cross-sectional view of one embodiment of the longitudinal beams 424, 426 having a constant thickness or gauge. More particularly, longitudinal beams 424, 426 include an exterior shell 424A, 426A having a thickness of approximately 3 mm and the structural webbing 474A has a thickness that is approximately 2.5 mm. However, it should be appreciated that the thickness can be selected for specific performance requirement optimization.

Figure 31:
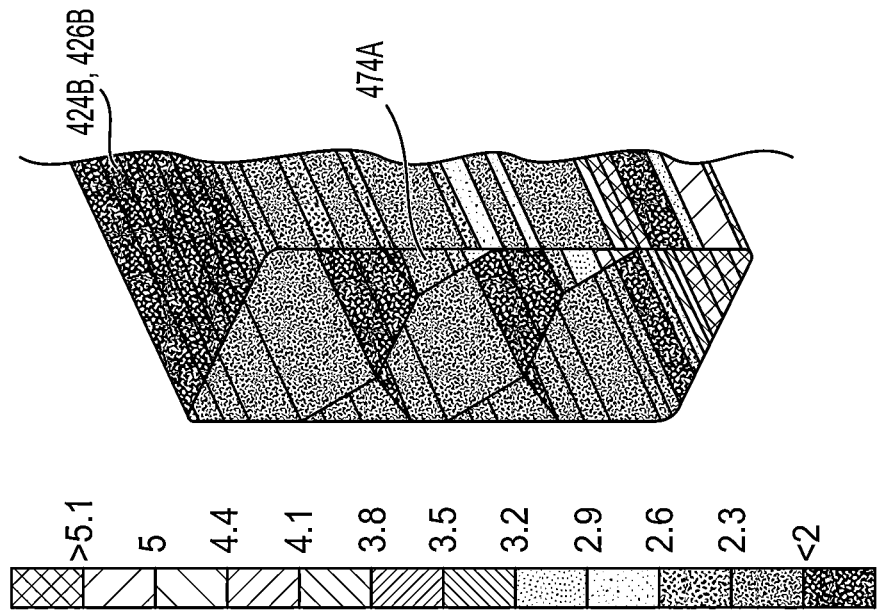
FIG. 31 is cross-sectional view of the longitudinal beam and the internal webbing having a varying thickness in accordance with one aspect of the disclosure.

FIG. 31 is a cross-sectional view of another embodiment of the longitudinal beams 424, 426 having a varied thickness or gauge that is completely optimized. More particularly, the exterior shell 424B, 426B of the longitudinal beams 424, 426 have a thickness of substantially 2 mm with portions interior cross-car direction having thicker sections, particularly in a lower interior corner wherein the thickness reaches approximately 4 mm. The structural webbing 474B likewise has a thickness that is substantially approximately 2 mm wherein the truss 78 on the interior cross-car direction includes thicker portions.

It should be appreciated that the longitudinal beam 424, 426 and/or webbing configuration 474 could also take the shape as bumper assembly and/or internal webbing disclosed in U.S. Patent Application No. 2018/02252416A1, titled "Bumper Beam," which is fully incorporated herein by reference. In addition, it should also be appreciated that the longitudinal beam 424, 426, webbing configuration 474, and/or connection configuration between the longitudinal beams 424, 426 and rails 427, 429 presented in FIG. 25 through 31 could be utilized in the other embodiments described herein and for a variety of other uses, such as other automobile components including those described within U.S. Application No. 2018/02252416A1.

In one arrangement, the front frame rails 427 and the rear frame rails 429 may be formed of steel or aluminum (for example steel) and the longitudinal beams 424, 426, the cross-members 428, 430 may be formed of steel or aluminum (for example aluminum). The longitudinal beams 424, 426 and the cross-members 428, 430 may be extruded or otherwise formed. The upper cover 434 and base plate 438 may also be formed of steel or aluminum (for example aluminum) and shaped via a stamping process or otherwise. Such example configurations have resulted in an approximately 44.8% weight reduction to conventional battery housings.

Figure 32:
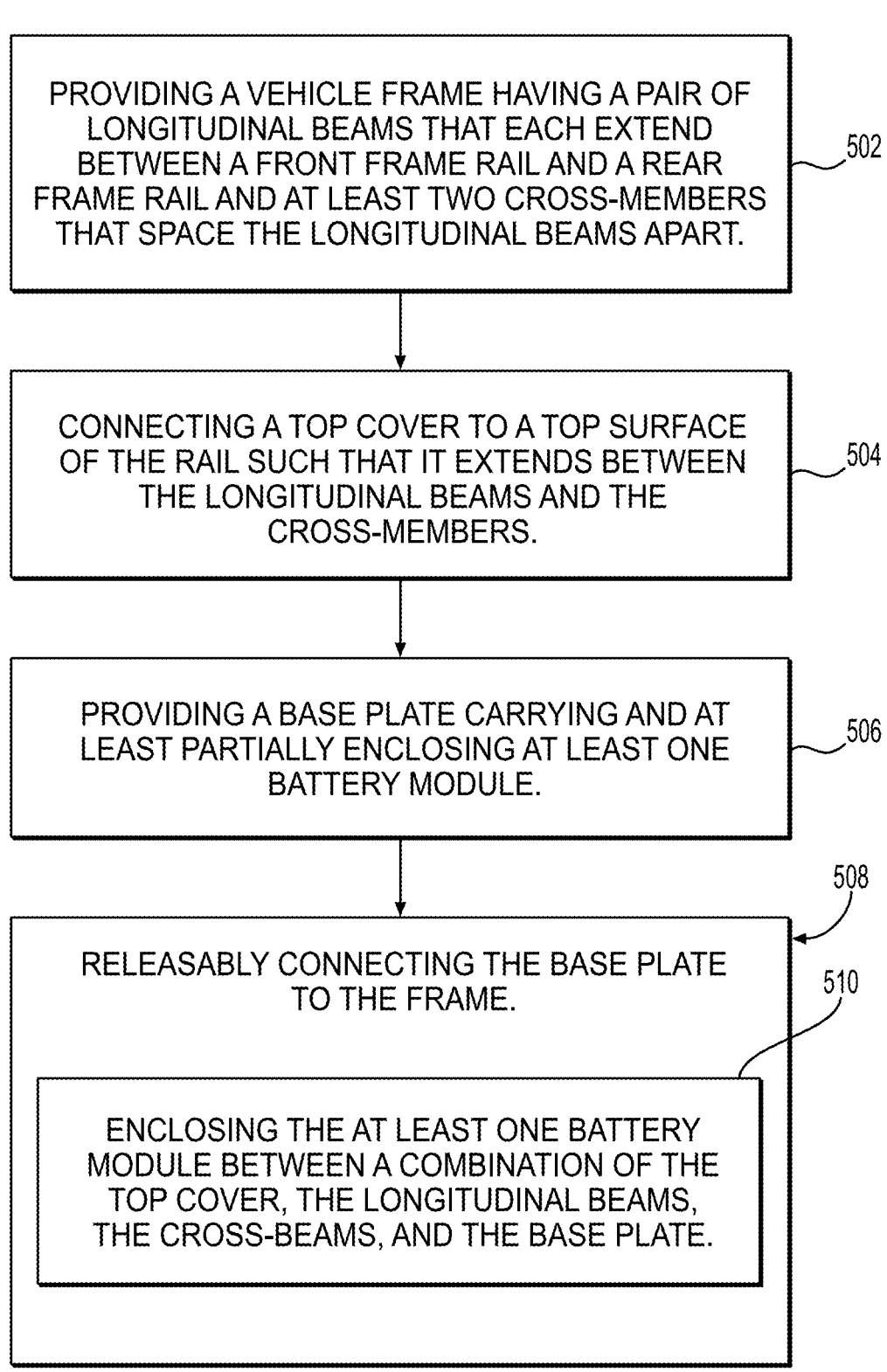
FIG. 32 is a method of assembling the frame assembly in accordance with one aspect of the disclosure.

In accordance with the above described assemblies, a method 500 of assembling a frame assembly is provided. The method 500 is illustrated in FIG. 32 and includes providing 502 a vehicle frame having a pair of longitudinal beams that each extend between a front frame rail and a rear frame rail and at least two cross-members that space the longitudinal beams apart. The method 500 continues by connecting 504 a top cover (e.g., upper cover) to a top surface of the frame (e.g., to a top surface of the longitudinal beams and the cross-members) such that it extends between the longitudinal beams and the cross-members. The length of the longitudinal beams can be lengthened or shortened to package the required battery modules. Accordingly, mating components can be updated to assemble as needed. The method 500 continues by providing 506 a base plate carrying and at least partially enclosing at least one battery module and releasably connecting 508 the base plate to a bottom surface of the frame (e.g., to a bottom surface of the longitudinal beams and the cross-members) such that it extends between the longitudinal beams and the cross-members. Step 508 may further include completely enclosing 510 the at least one battery module with a combination of the top cover, the longitudinal beams, the cross-beams, and the base plate.

Figure 33:
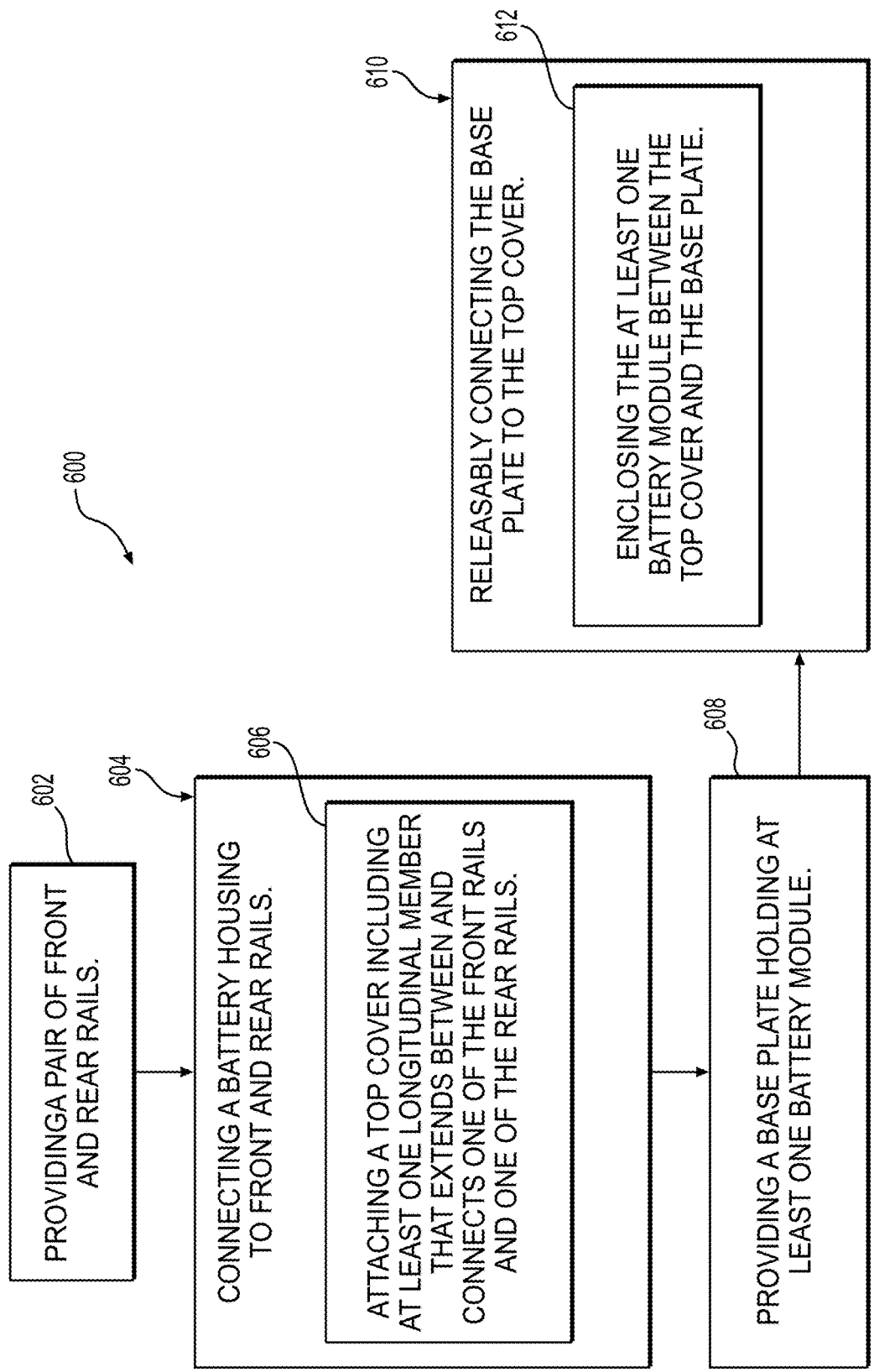
FIG. 33 is a method of assembling the frame assembly in accordance with one aspect of the disclosure.

In accordance with the above described assemblies, a method 600 of forming a frame assembly is provided. The method 600 is illustrated in FIG. 33 and includes providing 602 a pair of front rails and rear rails. At 604, the method 600 includes connecting a battery housing to the front and rear rails. The step 604 of connecting the battery housing may include attaching 606 a top cover (e.g., an upper cover) including at least one longitudinal member between a front rail and a rear rail to connect the front rail and rear rail and thus provide structural support to the frame and the battery housing. Next, at 608, the method 600 includes releasably connecting a base plate holding at least one battery module to the top cover. The step 610 may further include step 612 including completely enclosing the at least one battery module between the top cover and the base plate.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A frame assembly for an automobile comprising:
a pair of front frame rails disposed in spaced relationship with a pair of rear frame rails;
an upper cover connected to and extending between said pair of front frame rails and said pair of rear frame rails to define a roof portion;
said upper cover including a pair of longitudinal sidewalls and a pair of cross sidewalls each extending downwardly from said roof portion to define an upper pocket bounded by each of said roof portion, said pair of longitudinal sidewalls and said pair of cross sidewalls;
a base plate including a plate portion for supporting at least one battery module;
said base plate disposed in abutting and connected relationship with said upper cover to dispose said at least one battery module within said upper pocket; and
a pair of longitudinal reinforcement members extending along and in abutting relationship with an interior wall surface of a respective one of said pair of longitudinal sidewalls.

2. The frame assembly as set forth in claim 1, wherein said pair of longitudinal reinforcement members are each connected to a respective one of said pair of front frame rails and a respective one of said pair of rear frame rails.

3. The frame assembly as set forth in claim 1, wherein said at least one reinforcement member includes at least one intermediate reinforcement member extending in spaced and parallel relationship with said pair of longitudinal reinforcement members to define a plurality of columns in said upper pocket each defined by adjacent ones of said pair of longitudinal reinforcement members and said at least one intermediate reinforcement member.

4. The frame assembly as set forth in claim 3, wherein said base plate portion of said base plate supports a plurality of battery modules each disposed in one of said plurality of columns of said upper pocket.

5. The frame assembly as set forth in claim 1, wherein said plate portion includes an interior plate surface supporting said at least one battery module and an exterior plate surface disposed opposite said interior plate surface, and at least one support beam extending along said exterior plate surface.

6. The frame assembly as set forth in claim 5, wherein said at least one support beam includes a pair of longitudinal support beams disposed in spaced and parallel relationship with one another.

7. The frame assembly as set forth in claim 6, wherein said at least one support beam further includes at least one transverse support beam extending between said pair of longitudinal support beams.

8. The frame assembly as set forth in claim 1, wherein said roof portion is arranged flush with an upper rail surface of said pair of front frame rails and said pair of rear frame rails.

9. The frame assembly as set forth in claim 1, further comprising:
   said roof portion of said upper cover including a lower upper surface and a raised upper surface being at a higher elevation than said lower upper surface;
   said plate portion of said base plate including an upper base surface and a lower base surface being at a lower elevation than said upper base surface and disposed in aligned relationship with said raised upper surface of said roof portion; and
   said at least one battery module including at least one row of vertically stacked battery modules supported between said lower base surface of said plate portion and said raised upper surface of said roof portion.

10. The frame assembly as set forth in claim 9, wherein said raised upper surface of said roof portion and said lower base surface of said plate portion are disposed adjacent said pair of rear frame rails.

11. A frame assembly for an automobile comprising:
    a pair of front frame rails disposed in spaced relationship with a pair of rear frame rails;
    an upper cover connected to and extending between said pair of front frame rails and said pair of rear frame rails to define a roof portion;
    said upper cover including a pair of longitudinal sidewalls and a pair of cross sidewalls each extending downwardly from said roof portion to define an upper pocket bounded by each of said roof portion, said pair of longitudinal sidewalls and said pair of cross sidewalls;
    a base plate including a plate portion for supporting at least one battery module;
    said base plate disposed in abutting and connected relationship with said upper cover to dispose said at least one battery module within said upper pocket;
    said pair of longitudinal sidewalls and said pair of cross walls extending downwardly to an upper connection flange; and
    said base plate including a lip extending upwardly from said base plate portion to a base connection flange disposed in abutting and connected relationship with said upper connection flange.

12. The frame assembly as set forth in claim 11, further comprising a seal extending between said upper and base connection flanges to seal said upper pocket from an outside environment of the frame assembly.

13. The frame assembly as set forth in claim 12, wherein said upper and base connection flanges are connected via a plurality of fasteners.

\* \* \* \* \*